(12) United States Patent
Kato

(10) Patent No.: US 11,762,632 B2
(45) Date of Patent: Sep. 19, 2023

(54) INFORMATION PROCESSING DEVICE

(71) Applicant: Tamagawa University and Tamagawa Academy, Tokyo (JP)

(72) Inventor: Kentaro Kato, Tokyo (JP)

(73) Assignee: Tamagawa University and Tamagawa Academy, Tokyo (JP)

( * ) Notice: Subject to any disclaimer, the term of this patent is extended or adjusted under 35 U.S.C. 154(b) by 95 days.

(21) Appl. No.: 17/431,483

(22) PCT Filed: Feb. 18, 2019

(86) PCT No.: PCT/JP2019/005904
§ 371 (c)(1),
(2) Date: Aug. 17, 2021

(87) PCT Pub. No.: WO2020/170317
PCT Pub. Date: Aug. 27, 2020

(65) Prior Publication Data
US 2022/0137928 A1     May 5, 2022

(51) Int. Cl.
*G06F 21/00*     (2013.01)
*G06F 7/58*     (2006.01)
(Continued)

(52) U.S. Cl.
CPC .............. *G06F 7/582* (2013.01); *H04B 10/85* (2013.01); *H04L 9/0662* (2013.01)

(58) Field of Classification Search
None
See application file for complete search history.

(56) References Cited

U.S. PATENT DOCUMENTS 6,460,137 B1   10/2002   Akiyama et al.
7,557,941 B2 *   7/2009   Walmsley ............ G06F 21/445
                                                                358/1.14
(Continued)

FOREIGN PATENT DOCUMENTS

JP     H08-335040 A     12/1996
JP     2005-057313 A     3/2005
(Continued)

OTHER PUBLICATIONS

Gayoso, Carlos Arturo et al. Pseudorandom Number Generator based on the Residue Number System and its FPGA implementation. 2013 7th Argentine School of Micro-Nanoelectronics, Technology and Applications. https://ieeexplore.ieee.org/stamp/stamp.jsp?tp=&arnumber=6621070 (Year: 2013).*
(Continued)

*Primary Examiner* — Jeremiah L Avery
(74) *Attorney, Agent, or Firm* — Studebaker & Brackett PC

(57) ABSTRACT

The present invention improves data transmission safety and data transfer rate, and reduces an increase in costs when doing so. A map management unit 141 manages a map which defines a prescribed rule for dividing pseudorandom number data into two. On the basis of the rule defined by the map, a division unit 142 generates data obtained by dividing the pseudorandom number data into two as vertically irregular mapping input data and horizontally irregular mapping input data. A vertically irregular mapping unit 151 generates data obtained by subjecting the vertically irregular mapping input data to irregular mapping processing as vertical base reference point data. A horizontally irregular mapping unit 152 generates data obtained by subjecting the horizontally irregular mapping input data to irregular mapping processing as horizontal base reference point data. A base reference point information generation unit 133 decides on one base on the basis of the vertical base reference point data and the horizontal base reference point data.

3 Claims, 15 Drawing Sheets

(51) Int. Cl.
    *H04B 10/85*    (2013.01)
    *H04L 9/06*     (2006.01)

(56) References Cited

U.S. PATENT DOCUMENTS

| | | | | |
|---|---|---|---|---|
| 8,194,858 | B2* | 6/2012 | Bukshpun | H04L 9/0891 |
| | | | | 380/278 |
| 8,588,426 | B2* | 11/2013 | Xin | H04W 12/12 |
| | | | | 380/278 |
| 2005/0055546 | A1 | 3/2005 | Dzung | |
| 2006/0294312 | A1* | 12/2006 | Walmsley | H04L 9/3215 |
| | | | | 711/122 |
| 2011/0019817 | A1* | 1/2011 | Michaels | H04K 1/02 |
| | | | | 380/38 |
| 2012/0328100 | A1 | 12/2012 | Hirota | |

FOREIGN PATENT DOCUMENTS

| | | | |
|---|---|---|---|
| JP | 2012-085028 A | | 4/2012 |
| JP | 2013-021422 A | | 1/2013 |
| WO | 2012/046463 A1 | | 4/2012 |

OTHER PUBLICATIONS

Tan, Ai Hui et al. Design of computer-optimized pseudorandom maximum length signals for linear identification in the presence of nonlinear distortions. IEEE Transactions on Instrumentation and Measurement, vol. 54, Issue: 6. https://ieeexplore.ieee.org/stamp/stamp.jsp?tp=&arnumber=1542560 (Year: 2005).*

Ankur et al. A dissection of pseudorandom number generators. : 2015 2nd International Conference on Signal Processing and Integrated Networks (SPIN). https://ieeexplore.ieee.org/stamp/stamp.jsp?tp=&arnumber=7095369 (Year: 2015).*

Fui Lin Foo, Mathias et al. Pseudorandom Maximum Length Signal Design with Bias Compensation Least Squares Estimation for System Identification. 2007 IEEE Instrumentation & Measurement Technology Conference IMTC 2007. https://ieeexplore.ieee.org/stamp/stamp.jsp?tp=&arnumber=4258224 (Year: 2007).*

Gonzalez-Diaz, Victor R. et al. A Pseudorandom Number Generator Based on Time-Variant Recursion of Accumulators. IEEE Transactions on Circuits and Systems II: Express Briefs, vol. 58, Issue: 9. https://ieeexplore.ieee.org/stamp/stamp.jsp?tp=& arnumber= 5985506 (Year: 2011).*

International Search Report issued in PCT/JP2019/005904; dated May 14, 2019.

* cited by examiner

INFORMATION PROCESSING DEVICE

TECHNICAL FIELD

The present invention relates to an information processing device.

BACKGROUND ART

In recent years, security measures have become more important for information and communications. Network systems of the Internet are described using the Open System Interconnection (OSI) reference model, which was developed at the International Organization for Standardization. The OSI reference model is partitioned into seven layers from the physical layer (Layer 1) to the application layer (Layer 7), in which each interface between the layers is standardized or de facto standardized. Of those layers, the physical layer is at the bottom to play a role in the actual wired or wireless transmission and reception of signals. At present, security (often based on mathematical cryptography) is implemented at Layer 2 or higher, and no security measures are implemented at the physical layer. Unfortunately, there is also a risk of eavesdropping at the physical layer. For example, in optical fiber communication, a typical wired communication, it is possible in principle to steal a large amount of information at a time if a branched optical fiber is introduced to extract part of the signal power. Thus, a certain protocol, such as that disclosed in Patent Document 1, has been developed as an encryption technology in the physical layer.

Patent Document 1: Japanese Unexamined Patent Application, Publication No. 2012-085028

DISCLOSURE OF THE INVENTION

Problems to be Solved by the Invention

For example, the Yuen-2000 (hereinafter referred to as "Y-00") protocol disclosed as an encryption technology in Patent Document 1 may be used for increase in bit number to increase the data transmission rate. In general, when two constellation points (e.g., constellation points at two levels of optical signal intensity) are used for transmission and reception of signals, only one bit of information can be transmitted per constellation point. However, when four constellation points (e.g., constellation points at four levels of signal intensity) are used for communications, two bits of information can be transmitted per constellation point. This means that the data transmission rate can be increased by increasing the number of constellation points for increase in bit number. The conventional Y-00 protocol allows one bit of information to be transmitted in association with any two or more of a number of constellation points so as to make cracking difficult. That is, the Y-00 protocol is used on the premise that a number of constellation points are used. Therefore, if multiple bits of information are transmitted for each of a number of constellation points using the Y-00 protocol, the data transmission and reception rate could be increased.

Unfortunately, when a fixed number of constellation points are used for increase in bit number, the data transmission safety may decrease. To prevent this, it is necessary to increase the number of constellation points used for data transmission. Unfortunately, when the number of constellation points is simply increased, problems may occur, such as a complicated information processing device, increased costs for designing it, huge computational resources such as memories necessary for the information processing device, and increased costs for production and operation of them. In other words, there is a trade-off relationship between the data transmission safety or the data transmission rate improvement and the increase in costs therefor.

It is an object of the present invention to improve data transmission safety or data transmission rate and to keep low the increase in costs for such improvement.

Means for Solving the Problems

To achieve the object, an aspect of the present invention is directed to an information processing device that determines a signal modulation reference point based on predetermined first pseudorandom number information, the information processing device including:

a segmentation management section that segments the first pseudorandom number information into m types of second pseudorandom number information based on a predetermined rule;

a disordering section that subjects each of the m types of second pseudorandom number information to a predetermined disordering process to generate m types of base reference point information; and a modulation reference point determination section that determines m types of components for the signal modulation reference point based on the m types of base reference point information.

Effects of the Invention

The present invention makes it possible to improve data transmission safety or data transmission rate and to keep low the increase in costs for such improvement.

PREFERRED MODE FOR CARRYING OUT THE INVENTION

Hereinafter, embodiments of the present invention will be described with reference to the drawings.

Figure 1:
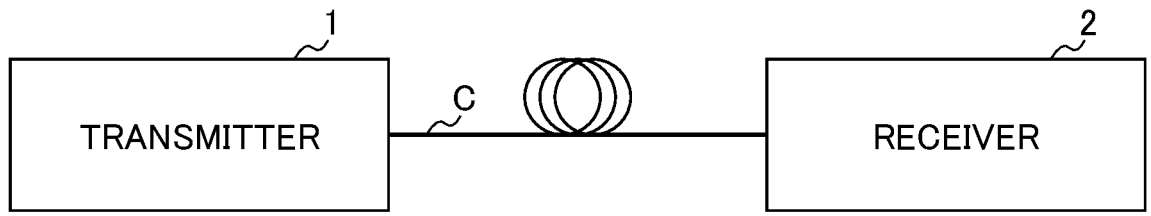
FIG. 1 is a diagram showing an example of the configuration of a cryptographic communication system including a transmitter as an information processing device according to an embodiment of the present invention.

FIG. 1 is a diagram showing an example of the configuration of a cryptographic communication system including a transmitter as an information processing device according to an embodiment of the present invention. The cryptographic communication system shown as an example in FIG. 1 includes a transmitter 1, a receiver 2, and an optical communication channel C. The transmitter 1 and the receiver 2 are connected through the optical communication channel C, such as an optical fiber. Thus, the transmitter 1 and the receiver 2 constitute a cryptographic communication system that performs cryptographic communication according to the Y-00 protocol. As used herein, the term "system" means an assembly of multiple devices or means and other components.

In the cryptographic communication system shown in FIG. 1, the transmitter 1 receives data from a personal computer (hereinafter, referred to as "PC") (not shown) or the like connected to the transmitter 1, in which the data is to be transmitted. After receiving the data from the PC, the transmitter 1 transmits, to the optical communication channel C, the data which is in the form of optical signals encrypted according to the Y-00 protocol. Subsequently, the receiver 2 receives the optical signals, which have been encrypted according to the Y-00 protocol, through the optical communication channel C, and then decrypts the optical signals according to the Y-00 protocol. After receiving and decrypting the optical signals, the receiver 2 further provides the optical signals to another PC or the like (not shown) connected to the receiver 2. When the cryptographic communication system of FIG. 1 is used, the optical signals encrypted according to the Y-00 protocol cannot be reconstructed in the form of digital data in the first place even if the third person intercepts the optical signals being transmitted through the optical communication channel C. Accordingly, the third person who has intercepted the optical signals cannot treat the optical signals in the form of encrypted data in the first place and this makes it difficult to crack the cipher text.

Figure 2:
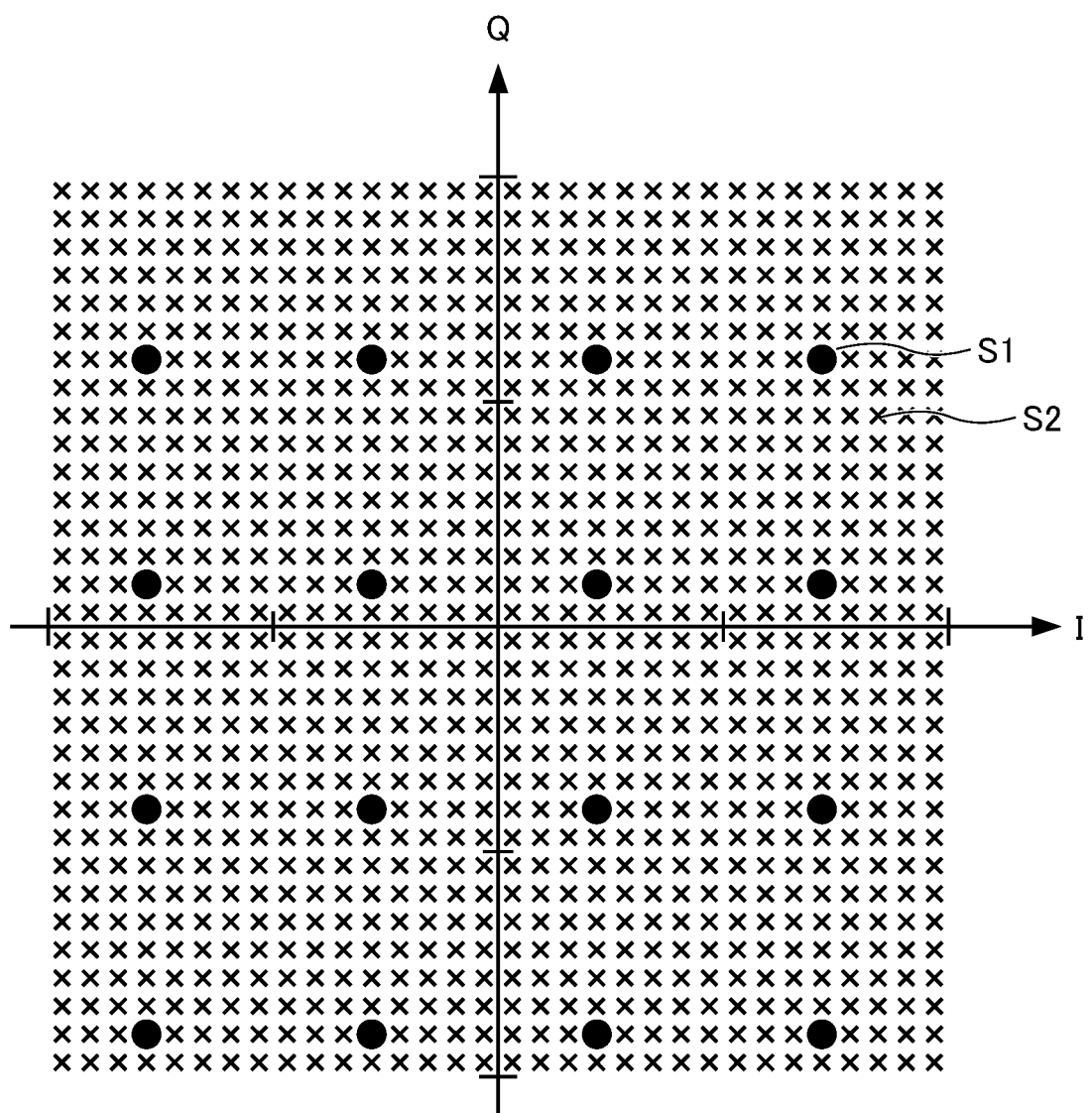
FIG. 2 is a diagram for illustrating the outline of the Y-00 protocol principle applied to the cryptographic communication system of FIG. 1.

Next, the outline of the principle of the Y-00 protocol will be described with reference to FIGS. 2 to 4. FIG. 2 is a diagram for illustrating the outline of the Y-00 protocol applied to the cryptographic communication system of FIG. 1. Although any modulation method, such as intensity modulation, amplitude modulation, phase modulation, frequency modulation, or quadrature amplitude modulation may be used to modulate optical signals according to the Y-00 protocol, an example using quadrature amplitude modulation (hereinafter referred to as "QAM") will be described below. In FIG. 2, the IQ plane representing the phase and amplitude of an optical signal is drawn, in which the origin is at the intersection between the vertical axis representing component Q and the horizontal axis representing component I. If a single point on the IQ plane is selected (hereinafter referred to as a "constellation point"), then the phase and amplitude of the optical signal are uniquely determined. The phase is represented by the angle between two lines, one of which is from the origin of the IQ plane to the constellation point of the optical signal, and to the other represents the phase 0. The amplitude is represented by the distance between the constellation point of the optical signal and the origin of the IQ plane. In FIG. 2, a constellation point S1 indicated by a solid circle and a constellation point S2 indicated by a cross are shown on the IQ plane. FIG. 2 shows 16 constellation points each indicated by a solid circle, including the constellation point S1, and shows, around them, many constellation points each indicated by a cross, including the constellation point S2. Although the optical signal may actually have an infinite number of phases and amplitudes, FIG. 2 shows a finite number of constellation points.

To transmit and receive signals, it is necessary to define constellation points for use in the actual transmission of signals. According to the Y-00 protocol, for example, 1,024 or more constellation points are used. However, for the sake of simplicity in describing embodiments below, signal transmission and reception using 16 constellation points will be described.

In the example of FIG. 2, 16 constellation points, including the constellation point S1, each indicated by a solid circle and each having a set of components I and Q, are used for signal transmission. It should be noted that any set of constellation points may be used for signal transmission and reception as long as they are shared by the transmitter 1 and the receiver 2. In other words, for example, information indicating that the constellation point S2 should be used for transmission and reception instead of the constellation point S1 may be shared among a set of constellation points. As used herein, the term "share" is not intended to mean only sharing by information transmission and reception between the transmitter 1 and the receiver 2. That is, for example, sharing can be achieved when the transmitter 1 and the receiver 2 can generate the same information through circuits, algorithm, manual input, or other operation.

Figure 3:
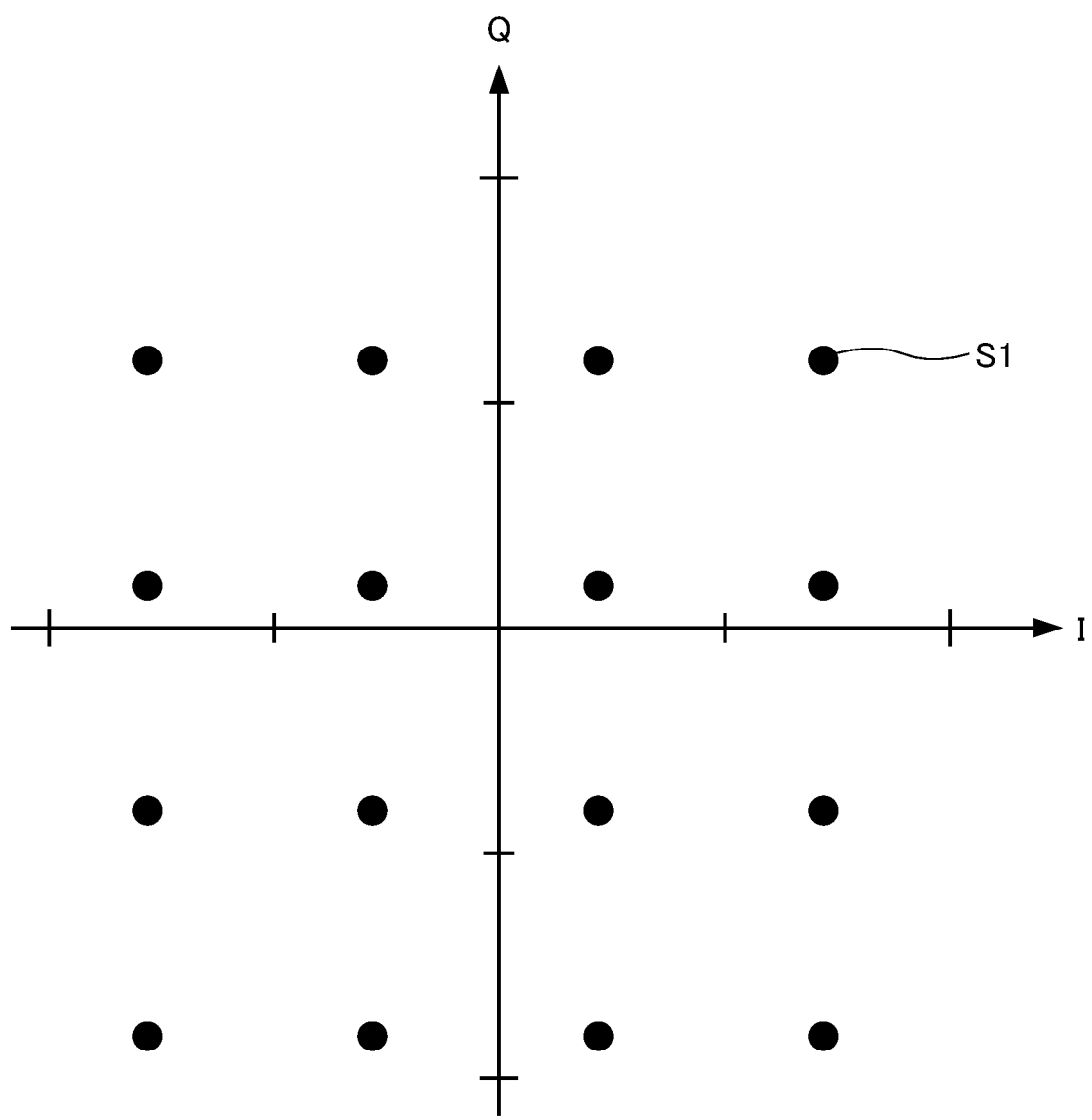
FIG. 3 is a diagram showing an example in which 16 of the constellation points shown in FIG. 2 are used to form a base.

FIG. 3 is a diagram showing an example in which 16 points each indicated by a solid circle, including the constellation point S1, are used to form a base, among the constellation points shown in FIG. 2. The term "base" refers to a set of constellation points for use in the transmission and reception of data between the transmitter 1 and the receiver 2. Specifically, when a certain base is determined, the number of constellation points in the base, the values of components I and Q of each constellation point, and other factors are also determined. Hereinafter, the base shown in FIG. 3 is called base B1. As mentioned above, the transmitter 1 and the receiver 2 may employ any constellation points in the base. In other words, an infinite number of bases may be defined. Therefore, for example, in FIG. 2, another base called base B2 may be defined using constellation points obtained by shifting each point by two units in the positive direction of the axis I and by two units in the negative direction of the axis Q. Specifically, in base B2, the constellation point S2 is used instead of the constellation point S1.

Information indicating the origin of the IQ plane is enough to identify such bases B1 and B2. In this case, for example, the information for identifying base B1 may be information indicating that the origin is shifted by 0 units in the axis I direction and by 0 units in the axis Q direction. The information for identifying base B2 may be information indicating that the origin is shifted by two units in the axis I direction and by minus two units in the axis Q direction. The information for identifying the base, namely, for determining the reference point, in this way is referred to as base reference point information. Specifically, to identify the base including a set of constellation points for transmission and reception of optical signals, it is enough for the transmitter 1 and the receiver 2 to share base reference point information. That is, the shared base reference point information enables the signal transmission and reception between the transmitter 1 and the receiver 2.

To improve the safety of data transmission, it is desirable to change the base reference point information with time. This makes it difficult for eavesdroppers to convert optical signals into meaningful digital data. The details of a process of changing the base reference point information will be described later with reference to FIGS. 13 to 16.

Next, information indicating which constellation point to transmit among the base when the target data is transmitted will be described with reference to FIG. 4. FIG. 4 is a diagram showing an example of in-base constellation point numbering for uniquely identifying each of the 16 constellation points shown in FIG. 3.

The transmitter 1 transmits the target information in association with any one of a number of constellation points constituting the base. FIG. 4 shows an example of in-base constellation point numbering from the base including 16 constellation points. In the example of FIG. 4, the in-base constellation point number Z0000 is assigned to the lower left constellation point, from which the in-base constellation point numbers Z0001, Z0011, and Z0010 are assigned in the horizontal direction. Specifically, in this example, the assigned in-base constellation point number starts with Z followed by a four-digit binary number. The last two digits of the in-base constellation point number represent the in-base constellation point numbering in the horizontal direction. The in-base constellation point numbering uses a gray code. Similarly, the in-base constellation point numbers Z0100, Z1100, and Z1000 are assigned in the vertical direction from the in-base constellation point number Z0000. The first two digits of the in-base constellation point number represent the in-base constellation point numbering in the vertical direction. Thus, the in-base constellation point numbering uniquely identifies the 16 constellation points in the base.

As mentioned above, the base may include any values of components I and Q according to the offset of the origin of the IQ plane for the base. Therefore, first, the transmitter 1 generates in-base constellation point number information, which associates the in-base constellation point numbers with the transmission target information. Subsequently, the transmitter 1 transmits an optical signal that is associated with a constellation point on the IQ plane based on the in-base constellation point number information indicating the constellation points in the base including the origin of a desired IQ plane and based on the base reference point information indicating the origin of the IQ plane.

The assignment of in-base constellation point numbers to constellation points is preferably changed with time in order to improve the safety of the data transmission. In this case, the same data is transmitted in association with any other constellation point, which makes it difficult for eavesdroppers to attempt cracking using, for example, data periodicity or frequency. The details of a process of changing the in-base constellation point number information will be described later with reference to FIGS. 8 to 12.

Figure 5:
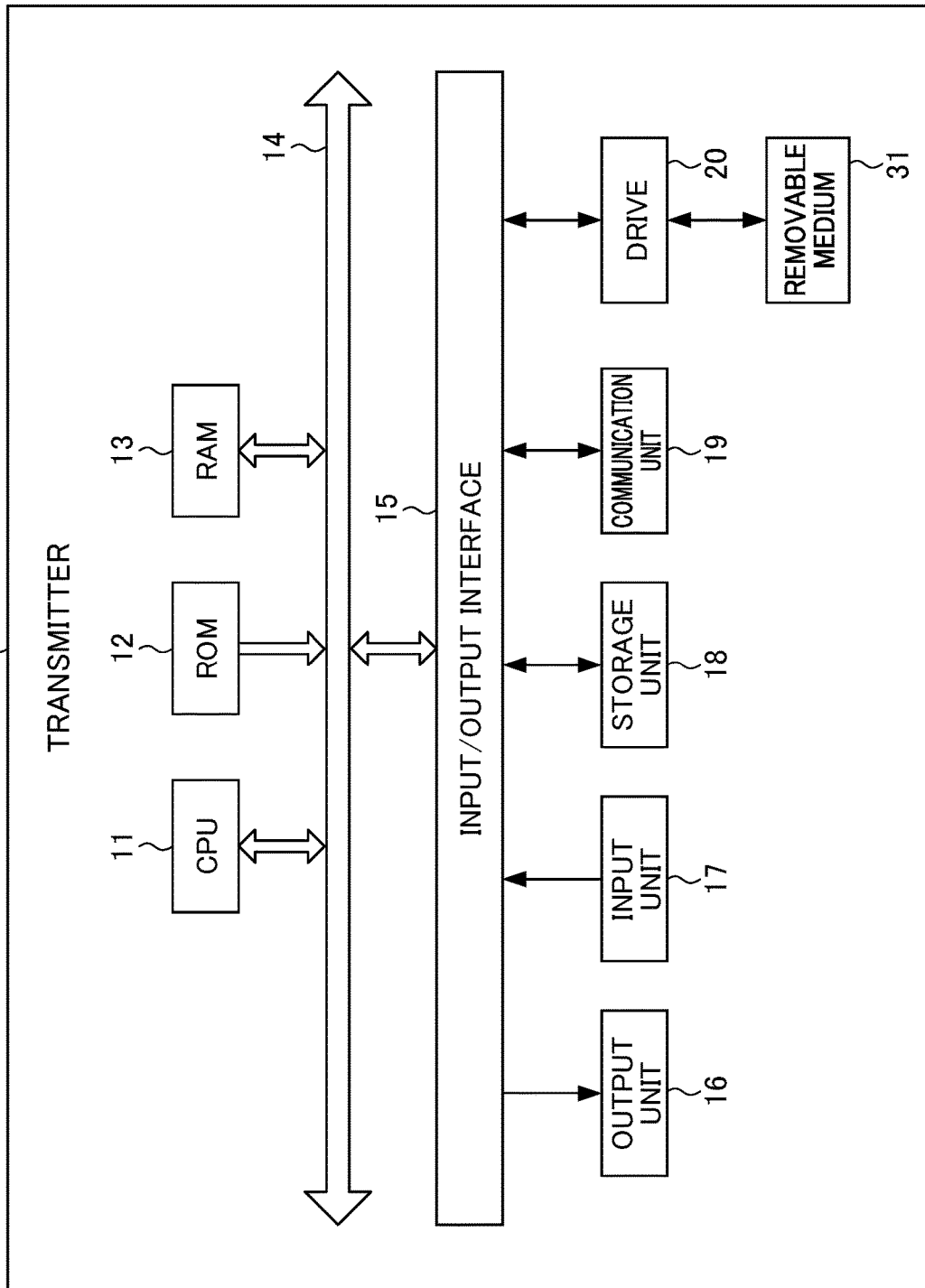
FIG. 5 is a block diagram showing an example of the hardware configuration of a transmitter in the cryptographic communication systems of FIG. 1.

Next, an example of the hardware configuration and the functional configuration of the transmitter 1 and the receiver 2 will be described with reference to FIGS. 5 to 7. FIG. 5 is a block diagram showing an example of the hardware configuration of the transmitter in the cryptographic communication system of FIG. 1.

The server 1 includes a central processing unit (CPU) 11, a read only memory (ROM) 12, a random access memory (RAM) 13, a bus 14, an input/output interface 15, an output unit 16, an input unit 17, a storage unit 18, a communication unit 19, and a drive 20.

The CPU 11 executes various processes according to programs stored in the ROM 12 or programs loaded into the RAM 13 from the storage unit 18. The RAM 13 also stores data necessary for the CPU 11 to execute various processes.

The CPU 11, the ROM 12, and the RAM 13 are connected to one another through the bus 14. The input/output interface 15 is also connected to the bus 14. The output unit 16, the input unit 17, the storage unit 18, the communication unit 19, and the drive 20 are connected to the input/output interface 15.

The output unit 16 includes a display, a speaker, and other components, and outputs various types of information in the form of images and sounds. The input unit 17 includes a keyboard, a mouse, and other components, and inputs various types of information.

The storage unit 18 includes a hard disk, a dynamic random access memory (DRAM), and other components, and stores various types of data. The communication unit 19 communicates with other devices (such as a user terminal 2 and an administrator terminal 3 in the example shown in FIG. 1) through network N including the Internet.

A removable medium 31 including a magnetic disk, an optical disk, a magneto-optical disk, a semiconductor memory, or the like is mounted on the drive 20 as needed. The program is read out of the removable medium 31 by the drive 20 and installed as needed in the storage unit 18. The removable medium 31 may also store various types of data as the storage unit 18 does.

The output unit 16 further includes an optical transmitter module that transmits optical signals. Specifically, the optical transmitter module includes, for example, an optical signal transmitter including: a light source that generates light for serving as an optical signal carrier wave; an optical modulator that modulates the carrier wave; and other components.

Although not shown, the receiver 2 in the cryptographic communication system of FIG. 1 has basically the same configuration as the hardware configuration shown in FIG. 5. However, the input unit of the receiver 2 further includes an optical receiver module that receives optical signals. Specifically, the optical receiver module includes, for example, an optical receiver including: a light receiving device that receives optical signals and converts them into electrical signals; and other components.

Figure 6:
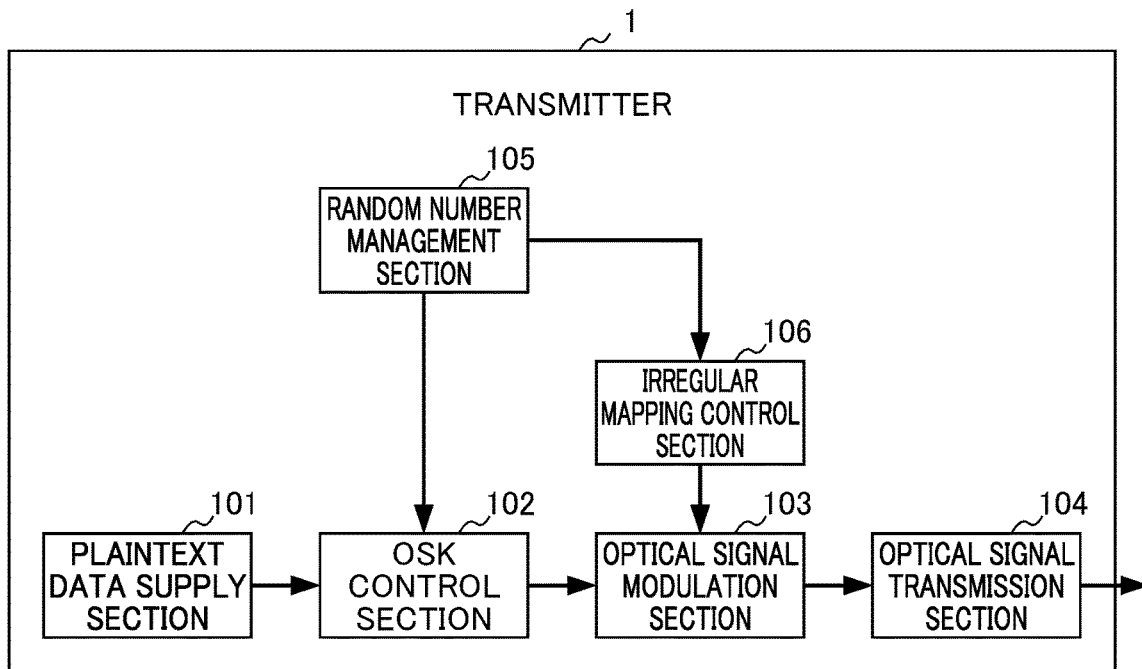
FIG. 6 is a functional block diagram showing an example of the functional configuration of the transmitter of FIG. 5.

FIG. 6 is a functional block diagram showing an example of the functional configuration of the transmitter of FIG. 5.

The transmitter 1 includes a plaintext data supply section 101, an OSK control section 102, an optical signal modulation section 103, an optical signal transmission section 104, a random number management section 105, and an irregular mapping control section 106.

The plaintext data supply section 101 acquires plaintext data as a transmission target from a data generator (not shown) and supplies the plaintext data to the OSK control section 102.

Based on first pseudorandom number data generated by the random number management section 105 described below, the OSK control section 102 performs a predetermined process including overlap selection keying (OSK) on the plaintext data as the transmission target and generates in-base constellation point number information identifying a constellation point for use in transmission among the base including multiple constellation points. The details of the process of generating the in-base constellation point number information from ciphertext data, which is executed by the OSK control section 102, will be described later with reference to FIG. 8. In this process, the first pseudorandom number data is pseudorandom number data that the OSK control section 102 uses, which is distinguished from second pseudorandom number data that the irregular mapping control section 106 (described later) uses. The "OSK" refers to a process of exclusive ORing (hereinafter referred to as "XORing") each bit of the plaintext data with each bit of the first pseudorandom number data, which is performed by the OSK control section 102. As a result, the bits "0" and "1" are scrambled in the plaintext data. Thus, the OSK control section 102 allows cracking by eavesdroppers to switch from known plaintext attack to ciphertext alone attack. As a result, the transmitter 1 improves the safety of data transmission.

Based on the in-base constellation point number information generated by the OSK control section 102 and the base reference point information generated by the irregular mapping control section 106 described later, the optical signal modulation section 103 modulates an optical signal serving as a carrier of information transmitted from the transmitter 1. The optical signal transmission section 104 transmits the optical signal modulated by the optical signal modulation section 103.

The random number management section 105 manages each of pseudorandom numbers for use in the transmitter 1. For example, the random number management section 105 generates and manages the first pseudorandom number data based on a first common key. In this process, the first common key is a fixed-length bit stream used as an initial value for the generation of pseudorandom number data in the OSK control section 102, and distinguished from a second common key which is a fixed-length bit stream used as an initial value for the generation of pseudorandom number data in the irregular mapping control section 106 described later. The random number management section 105 further generates and manages second pseudorandom number data based on the second common key. In this process, the second pseudorandom number data is pseudorandom number data used in the irregular mapping control section 106 as mentioned above, and distinguished from the first pseudorandom number data used in the OSK control section 102.

Based on the second pseudorandom number data generated by the random number management section 105, the irregular mapping control section 106 performs a predetermined process including irregular mapping on the second pseudorandom number data and generates base reference point information identifying the reference point for constellation points corresponding to in-base constellation point numbers. The details of the process of generating the base reference point information from the second pseudorandom number data, which is executed by the irregular mapping control section 106, will be described later with reference to FIG. 13. As used herein, the term "irregular mapping" refers to a process of reordering each bit in the second pseudorandom number data, in other words, a process of irregular mapping of the second pseudorandom number data, which is performed by the irregular mapping control section 106. In general, since pseudorandom numbers are generated based on a predetermined algorithm, the bits of the pseudorandom numbers are correlated with each other. To address this, the irregular mapping control section 106 performs the irregular mapping to reduce the correlation between the bits of the pseudorandom numbers. Thus, even if an eavesdropper steals the data and analyzes the second pseudorandom number data or the pattern of the process based on the second pseudorandom number data, for example, through correlation attack, the irregular mapping control section 106 renders it difficult for the eavesdropper to crack the base reference point information from the data. As a result, the transmitter 1 improves the safety of data transmission.

Figure 7:
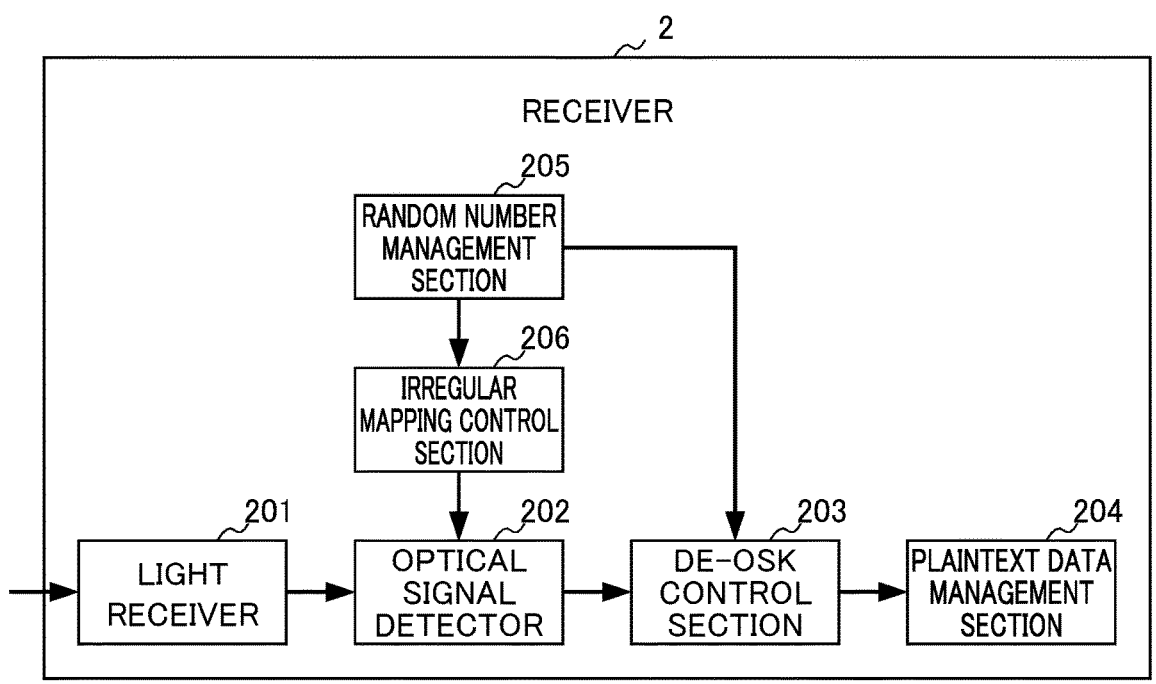
FIG. 7 is a functional block diagram showing an example of the functional configuration of a receiver shown in FIG. 1.

FIG. 7 is a functional block diagram showing an example of the functional configuration of the receiver shown in FIG. 1.

The receiver 2 includes a light receiver 201, an optical signal detector 202, a de-OSK control section 203, a plaintext data management section 204, a random number management section 205, and an irregular mapping control section 206.

The light receiver 201 receives the optical signal transmitted from the transmitter 1 through the optical communication channel C. Based on the optical signal that the optical signal detector 202 has received and the base reference point information that the irregular mapping control section 206 described later has generated, the optical signal detector 202 generates in-base constellation point number information associated with the received constellation point among the base including multiple constellation points.

Based on first pseudorandom number data generated by the random number management section 205 described later, the de-OSK control section 203 performs a predetermined process including de-OSK on the in-base constellation point number information, which is data received from the transmitter, and restores the plaintext data. The de-OSK refers to a process of XORing each bit of the first pseudorandom number data with each bit of the ciphertext data, which is performed by the de-OSK control section 203, in which the ciphertext data has been generated by performing the predetermined process on the in-base constellation point number information received from the transmitter. As a result, the scrambled "0" and "1" bits in the ciphertext data are restored so that the plaintext data is restored. In this process, the first pseudorandom number data is the same as the pseudorandom number data used in the OSK control section 102 of the transmitter 1 described above, and distinguished from the second pseudorandom number data used in the irregular mapping control section 106 described later.

The plaintext data management section 204 performs management, such as supplying, to a user (not shown), the plaintext data restored by the de-OSK control section 203.

The random number management section 205 basically has the same function and configuration as those of the random number management section 105 of the transmitter 1 shown in FIG. 6. Specifically, the random number management section 205 generates and manages first pseudorandom number data based on the first common key. The random number management section 205 also generates and manages second pseudorandom number data based on the second common key. That is, the random number management section 205 of the receiver 2 generates and manages the first pseudorandom number data and the second pseudorandom number data respectively based on the first and second common keys, which are the same as those for the random number management section 105 of the transmitter 1. Thus, the pseudorandom number information for the encryption by the transmitter 1 and the pseudorandom number information for the decryption by the receiver 2 are shared. The irregular mapping control section 206 also has the same function and configuration as those of the irregular mapping control section 106 shown in FIG. 6.

Figure 8:
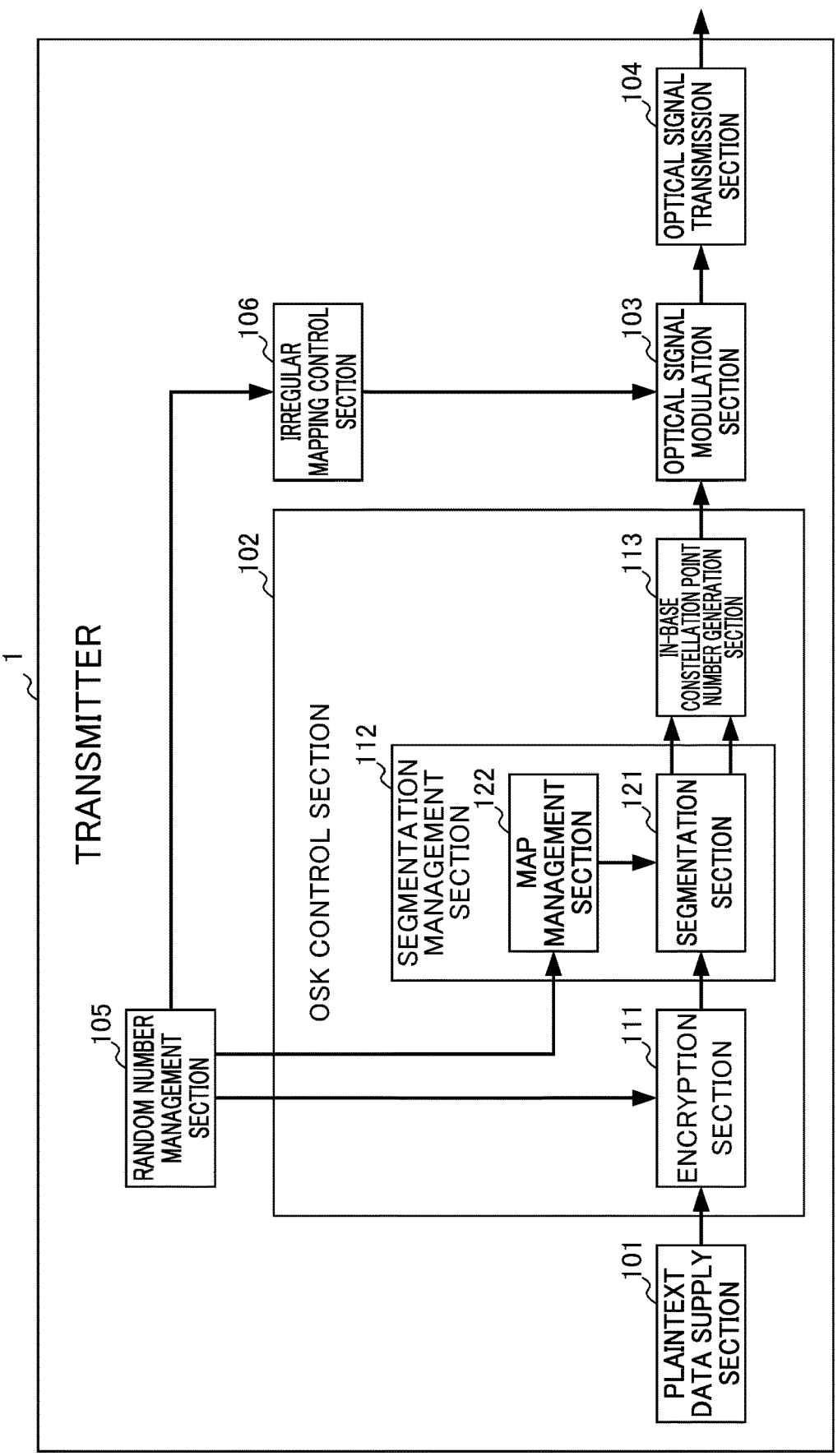
FIG. 8 is a block diagram showing an example of the detailed configuration of an overlap selection keying (OSK) control section in the transmitter of FIG. 6.
Figure 9:
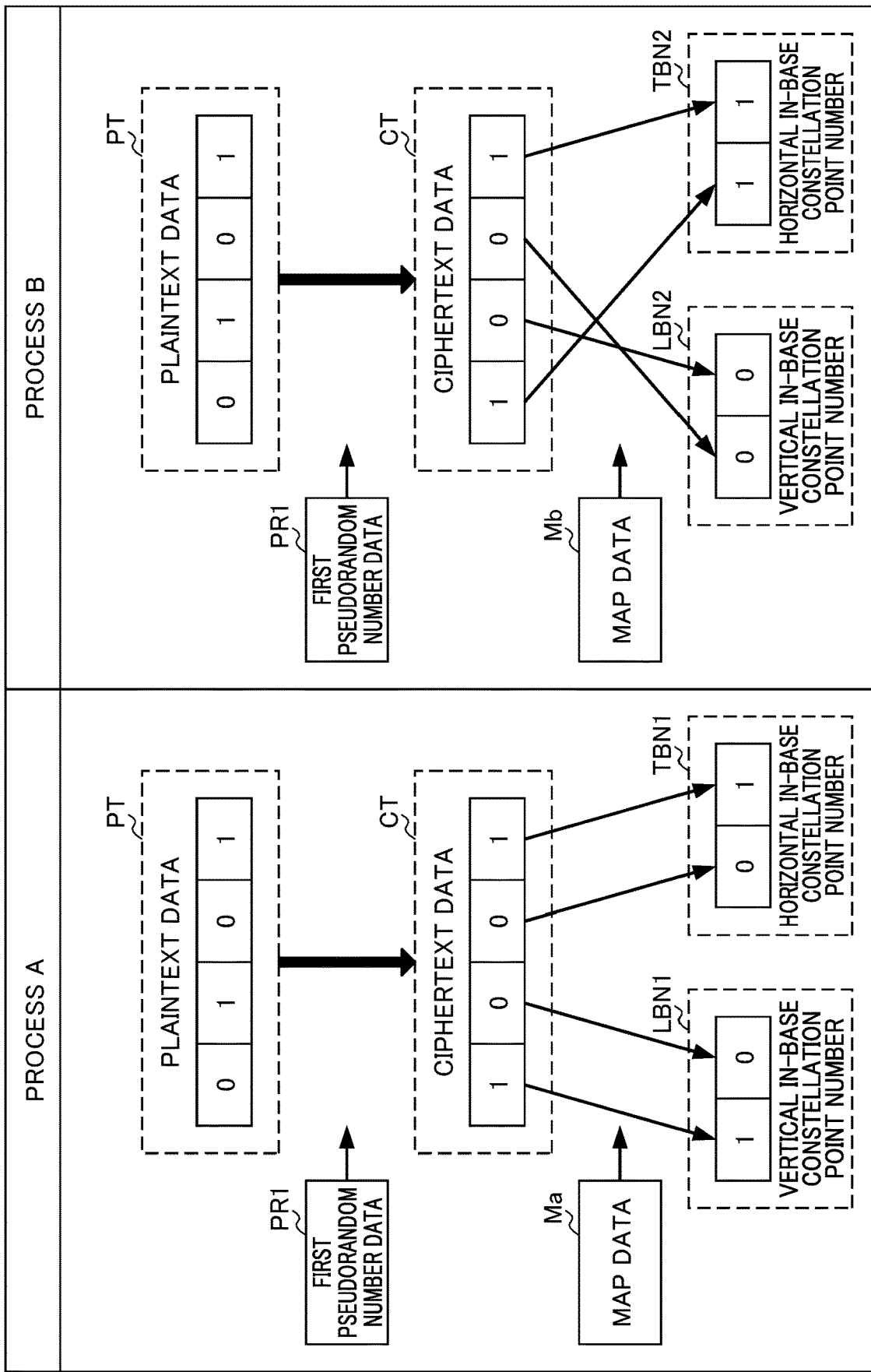
FIG. 9 is a diagram showing an example of plaintext data encryption and an example of in-base constellation point numbering, which are performed using the OSK shown in FIG. 8.
Figure 10:
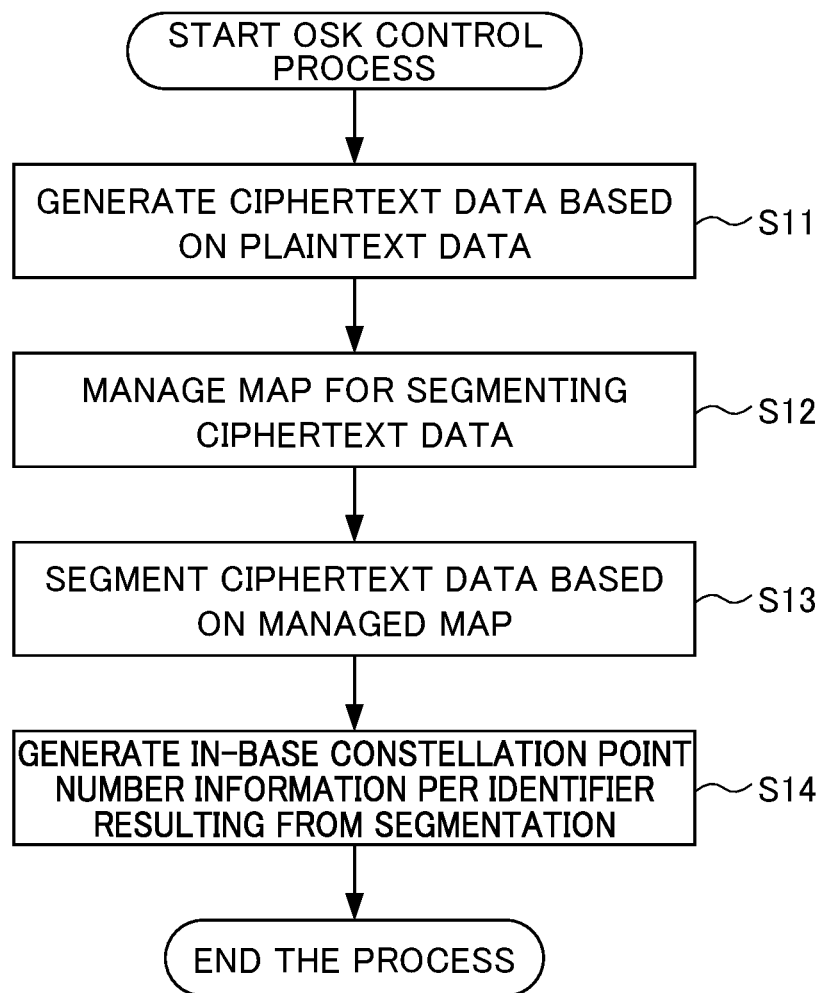
FIG. 10 is a flowchart for illustrating an example of the flow of the OSK executed by the transmitter with the functional configuration shown in FIG. 8.

Next, with reference to FIGS. 8 to 10, a detailed description will be provided of the process of generating the in-base constellation point number information from ciphertext data, which is executed by the OSK control section 102 of the transmitter 1 shown in FIG. 6.

FIG. 8 is a block diagram showing an example of the detailed configuration of the OSK control section in the transmitter shown in FIG. 6. The OSK control section 102 in the example of FIG. 8 includes an encryption section 111, a segmentation management section 112, and an in-base constellation point number generation section 113.

The encryption section 111 generates an identifier capable of uniquely identifying predetermined information, which is referred to as a predetermined information identifier. For example, the encryption section 111 performs the OSK on plaintext data as a transmission target to generate ciphertext data. Specifically, for example, based on the first pseudorandom number data, the encryption section 111 performs the OSK on the plaintext data as a transmission target to generate ciphertext data in which the "0" and "1" bits of the plaintext data are scrambled.

The segmentation management section 112 includes a segmentation section 121 and a map management section 122. Based on a predetermined rule, the segmentation management section 112 segments the predetermined information identifier into n types of identifiers, wherein n is an integer of 2 or more. Specifically, for example, based on map data, the segmentation management section 112 segments the ciphertext data into two types of in-base constellation point numbers: vertical in-base constellation point numbers and horizontal in-base constellation point numbers.

Based on the map data supplied from the map management section 122 (described later), the segmentation section 121 segments the bits of the ciphertext data into bits of vertical in-base constellation point number and bits of horizontal in-base constellation point number to generate vertical in-base constellation point number information and horizontal in-base constellation point number information. The details of an example of the segmentation by the segmentation section 121 will be specifically described later with reference to FIG. 9.

The map management section 122 manages maps for the segmentation and supplies map data to the segmentation section 121. Specifically, for example, based on third pseudorandom number data supplied from the random number management section 105, the map management section 122 selects, from the maps it manages, a map to be actually used, and supplies the map data to the segmentation section 121. The details of an example of the map selected for segmentation by the map management section 122 will be described later with reference to FIG. 9.

Based on a set of n types of identifiers, the in-base constellation point number generation section 113 generates information to be transmitted. Specifically, for example, based on a set of two types of in-base constellation point numbers including vertical in-base constellation point number information and horizontal in-base constellation point number information, the in-base constellation point number generation section 113 generates in-base constellation point number information indicating which constellation point to transmit among the base.

Next, an example of the method of performing a predetermined process including the OSK on the plaintext data to generate in-base constellation point number information will be described with reference to FIG. 9.

FIG. 9 is a diagram showing an example of how to encrypt plaintext data by the OSK shown in FIG. 8 and how to generate in-base constellation point numbers. FIG. 9 shows process A, which is an example using basic map data for a predetermined process including: encrypting plaintext data by the OSK shown in FIG. 8; and generating in-base constellation point numbers. In an example of process A shown in FIG. 9, the bit stream "0101" of plaintext data PT is provided as an example of the data to be transmitted. Although not shown, "1100" is provided as first pseudorandom number data PR1.

In an example of process A shown in FIG. 9, the following information is provided as an example of map data Ma. The first bit of the ciphertext data CT is associated with the higher bit of the vertical in-base constellation point number LBN1. The second bit of the ciphertext data CT is associated with the lower bit of the vertical in-base constellation point number LBN1. The third bit of the ciphertext data CT is associated with the higher bit of the horizontal in-base constellation point number TBN1. The fourth bit of the ciphertext data CT is associated with the lower bit of the horizontal in-base constellation point number TBN1.

First, the encryption section 111 performs XOR operation based on the plaintext data PT and the first pseudorandom number data PR1 to generate ciphertext data CT. Specifically, for example, the encryption section 111 performs XORing the bit stream "0101" of the plaintext data PT with the bit stream "1100" of the first pseudorandom number data PR1 to generate the bit stream "1001" as ciphertext data CT.

Subsequently, based on the map data Ma supplied from the map management section 122, the segmentation section 121 segments the ciphertext data CT into a vertical in-base constellation point number LBN1 and a horizontal in-base constellation point number TBN1. Specifically, for example, based on the ciphertext data CT and the map data Ma, the segmentation section 121 generates "10" as the vertical in-base constellation point number LBN1 and "01" as the horizontal in-base constellation point number TBN1.

Subsequently, based on the vertical in-base constellation point number LBN1 and the horizontal in-base constellation point number TBN1, the in-base constellation point number generation section 113 generates in-base constellation point number information. Specifically, for example, the in-base constellation point number generation section 113 concatenates the vertical in-base constellation point number LBN1 and the horizontal in-base constellation point number TBN1 to generate "1001" as the in-base constellation point number information. As a result, for example, a constellation point represented by the in-base constellation point number Z1001 is identified from the base including the 16 constellation points shown in FIG. 4. In this way, the OSK control section 102 generates the in-base constellation point number Z1001 in the example of process A shown in FIG. 9.

FIG. 9 also shows process B, which is an example using map data, which is different from that in process A shown in FIG. 9, for a predetermined process including: encrypting plaintext data by the OSK shown in FIG. 8; and generating in-base constellation point numbers. In an example of process B shown in FIG. 9, the plaintext data PT and the first pseudorandom number data PR1 provided are the same as those in the example of process A shown in FIG. 9.

In an example of process B shown in FIG. 9, the following information is provided as an example of map data Mb. The first bit of the ciphertext data CT is associated with the higher bit of the horizontal in-base constellation point number TBN2. The second bit of the ciphertext data CT is associated with the lower bit of the vertical in-base constellation point number LBN2. The third bit of the ciphertext data CT is associated with the higher bit of the vertical in-base constellation point number LBN2. The fourth bit of the ciphertext data CT is associated with the lower bit of the horizontal in-base constellation point number TBN2.

First, the encryption section 111 performs XORing based on the plaintext data PT and the first pseudorandom number data PR1 to generate ciphertext data CT, as in the example of process A shown in FIG. 9.

Subsequently, based on the map data Mb supplied from the map management section 122, the segmentation section 121 segments the ciphertext data CT into a vertical in-base constellation point number LBN2 and a horizontal in-base constellation point number TBN2. Specifically, for example, based on the ciphertext data CT and the map data Mb, the segmentation section 121 generates "00" as the vertical in-base constellation point number LBN2 and "11" as the horizontal in-base constellation point number TBN2.

Subsequently, based on the vertical in-base constellation point number LBN2 and the horizontal in-base constellation point number TBN2, the in-base constellation point number generation section 113 generates in-base constellation point number information. Specifically, for example, the in-base constellation point number generation section 113 concatenates the vertical in-base constellation point number LBN2 and the horizontal in-base constellation point number TBN2 to generate the in-base constellation point number "0011" as the in-base constellation point number information. As a result, for example, a constellation point represented by the in-base constellation point number Z0011 is identified from the base including the 16 constellation points shown in FIG. 4. In this way, the OSK control section 102 generates the in-base constellation point number Z0011 in the example of process B shown in FIG. 9.

Figure 4:
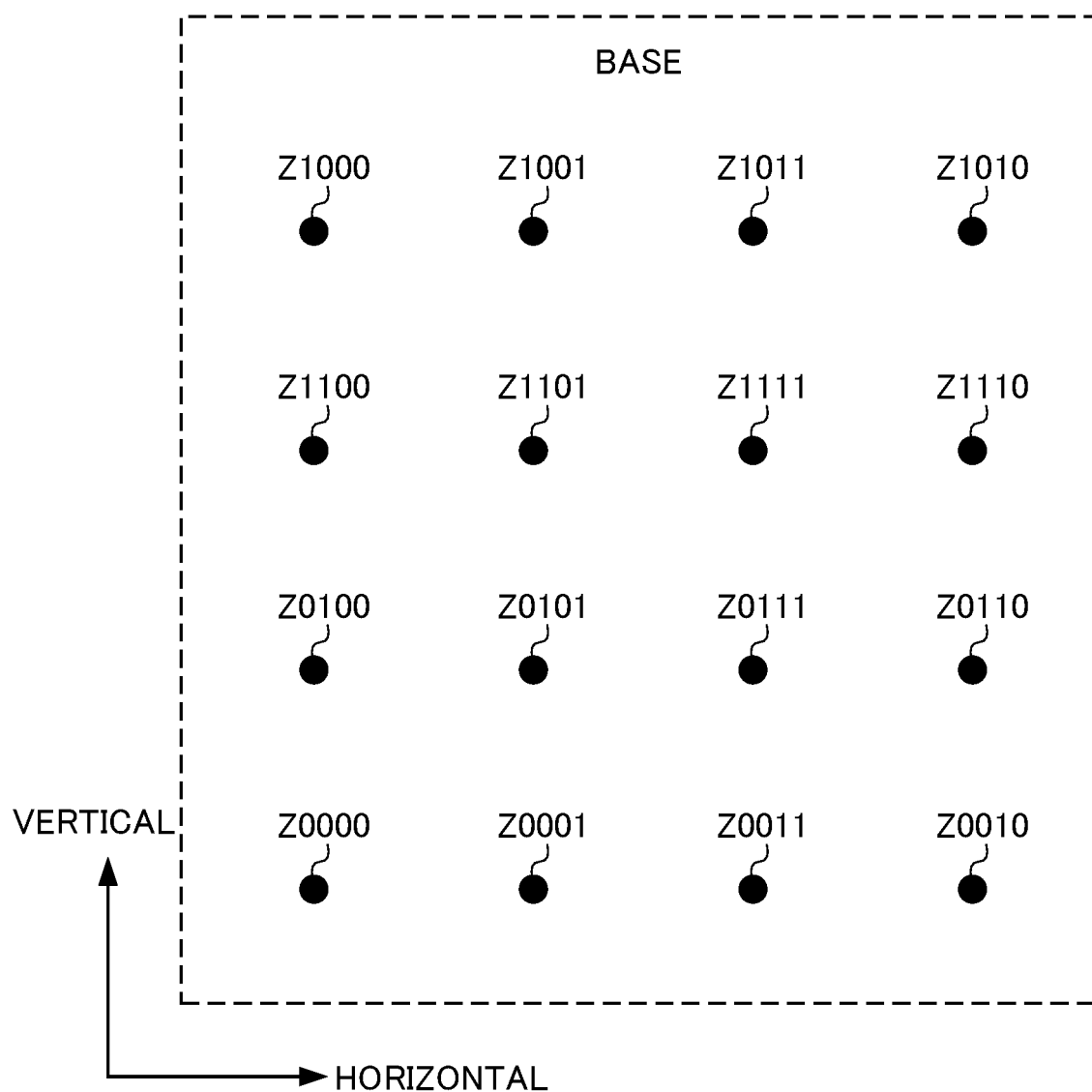
FIG. 4 is a diagram showing an example of in-base constellation point numbering used to uniquely identify each of 16 constellation points in FIG. 3.

In the example shown in FIG. 4, the last two digits of the in-base constellation point number correspond to the component I-determining in-base constellation point number as mentioned above. The first two digits of the in-base constellation point number correspond to the component Q-determining in-base constellation point number. In the example shown in FIG. 9, therefore, the horizontal in-base constellation point numbers TBN1 and TBN2 are component I-determining in-base constellation point numbers, and the vertical in-base constellation point numbers LBN1 and LBN2 are component Q-determining in-base constellation point numbers.

As shown above, based on the map data, the segmentation section 121 segments the ciphertext data CT into component I-determining horizontal in-base constellation point numbers and component Q-determining vertical in-base constellation point numbers. That is, the horizontal in-base constellation point number and the vertical in-base constellation point number can be each independently controlled in order to determine each of components I and Q. When the ciphertext data CT is segmented into the two segments: the vertical in-base constellation point number and the horizontal in-base constellation point number, the following advantageous effects can be achieved.

The increase in costs for the design and construction of the transmitter 1 can be kept low as compared to the case in which the in-base constellation point number information is simply generated. Specifically, for example, the size of the table for assigning in-base constellation point numbers to constellation points can be reduced as shown below.

First, an example of the table for assigning in-base constellation point numbers to constellation points for simple generation of the in-base constellation point number information will be shown below. The in-base constellation point numbers uniquely identify the multiple constellation points of the base. Therefore, the table for identification by assigning in-base constellation point numbers to constellation points needs to have a size corresponding to the number of the constellation points. In this case, the size of the table corresponds to the number of assignments in the table. Specifically, in the example shown above, a table is necessary in which 16 in-base constellation point numbers are assigned to 16 constellation points. Specifically, for example, the table starts as follows. The in-base constellation point number Z0000 has the first smallest component I and the first smallest component Q. The in-base constellation point number Z0001 has the second smallest component I and the first smallest component Q.

Next, an example of the table for assigning in-base constellation point numbers to constellation points for segmentation of ciphertext data CT into two segments: vertical in-base constellation point numbers and horizontal in-base constellation point numbers will be described below. As mentioned above, the horizontal in-base constellation point number and the vertical in-base constellation point number determine the components I and Q, respectively. Therefore, two tables are necessary for identification by assigning in-base constellation point numbers to constellation points. The horizontal in-base constellation point number table needs to have a size corresponding to the number of horizontal in-base constellation point numbers, and the vertical in-base constellation point number table needs to have a size corresponding to the number of vertical in-base constellation point numbers. Specifically, in the example shown above, a table is necessary in which 4 horizontal in-base constellation point numbers are assigned to 4 constellation points. Specifically, for example, the table starts as follows. The horizontal in-base constellation point number 00 has the first smallest component I. The horizontal in-base constellation point number 01 has the second smallest component I.

Similarly, another table is necessary in which 4 vertical in-base constellation point numbers are assigned to 4 constellation points. Therefore, the horizontal in-base constellation point number table and the vertical in-base constellation point number table have a total size of 8. This is smaller than the size 16 in the case of the simple generation of in-base constellation point number information.

In the actual use of the Y-00 protocol, for example, the number of horizontal in-base constellation point numbers is 1,024 (L=1,024). In this case, it is assumed that the number of vertical in-base constellation point numbers is also 1,024 (L=1,024).

When the ciphertext data CT is segmented into the two segments: vertical in-base constellation point numbers and horizontal in-base constellation point numbers, the tables for assigning in-base constellation point numbers to constellation points have a size M1 of 2,048, which is the sum of the sizes of the vertical in-base constellation point number table and the horizontal in-base constellation point number table (twice the size L).

On the other hand, when the in-base constellation point number information is simply generated, the table for assigning in-base constellation point numbers to constellation points will have a size M1 of 1,048,576, which is the square of the number (L) of constellation points. Therefore, when the ciphertext data CT is segmented into the two segments:
vertical in-base constellation point numbers and horizontal in-base constellation point numbers, the table size is reduced to 1/512.

The reduction in the size of the table for assigning in-base constellation point numbers to constellation points helps to reduce the data capacity of the storage unit 18 for storing tables or to reduce the data capacity of the RAM 13. This helps to reduce the lower limit of the performance required of the hardware in the transmitter 1. In other words, the transmitter 1 can be constructed with lower cost.

In the example shown in FIG. 4, in-base constellation point number information is assigned to constellation points in a regular order, which is non-limiting. As mentioned above, the assignment of in-base constellation point numbers to constellation points is preferably changed with time in order to improve the safety of the data transmission.

As described above, based on the map data supplied from the map management section 122, the segmentation section 121 segments the bits of the ciphertext data into the bits of the vertical in-base constellation point number and the bits of the horizontal in-base constellation point number to generate vertical in-base constellation point number information and horizontal in-base constellation point number information. Based on third pseudorandom number data, the map management section 122 can also switch the map data to be supplied. Specifically, the third pseudorandom number data may be replaced after a certain time period so that the map data to be supplied is changed and the assignment of in-base constellation point numbers to constellation points is changed with time. This helps to improve the safety of the data transmission while keeping the cost increase low. This also helps to reduce the complexity of the design of the individual map data. In other words, the segmentation of the in-base constellation point number helps to keep low the increase in costs for the design of the transmitter 1 when the number of constellation points in the base is increased.

On the other hand, when the in-base constellation point number information is simply generated, it will be necessary to store multiple tables in which complicated shuffling has been made for the assignment of in-base constellation point numbers to constellation points. In this case, the table size becomes so large as to further increase the lower limit of the performance required of the hardware in the transmitter 1.

FIG. 10 is a flowchart for illustrating an example of the flow of the OSK control process executed by the transmitter having the functional configuration shown in FIG. 8. The OSK control process is executed to perform a predetermined process including OSK on the plaintext data as a transmission target and to generate in-base constellation point number information indicating which constellation point to transmit among the base including multiple constellation points.

In step S11, the encryption section 111 generates ciphertext data based on the first pseudorandom number data and the plaintext data as a transmission target.

In step S12, the map management section 122 manages the map for segmentation and supplies the map data.

In step S13, the segmentation section 121 segments, based on the map data, the bits of the ciphertext data into bits of vertical in-base constellation bits of point number and horizontal in-base constellation point number.

In step S14, the in-base constellation point number generation section 113 generates in-base constellation point number information indicating which constellation point to transmit among the base, based on a set of two in-base constellation point numbers including the vertical in-base constellation point number information and the horizontal in-base constellation point number information.

The flow of the OSK control process executed by the transmitter 1 has been described with reference to FIG. 10.

Figure 11:
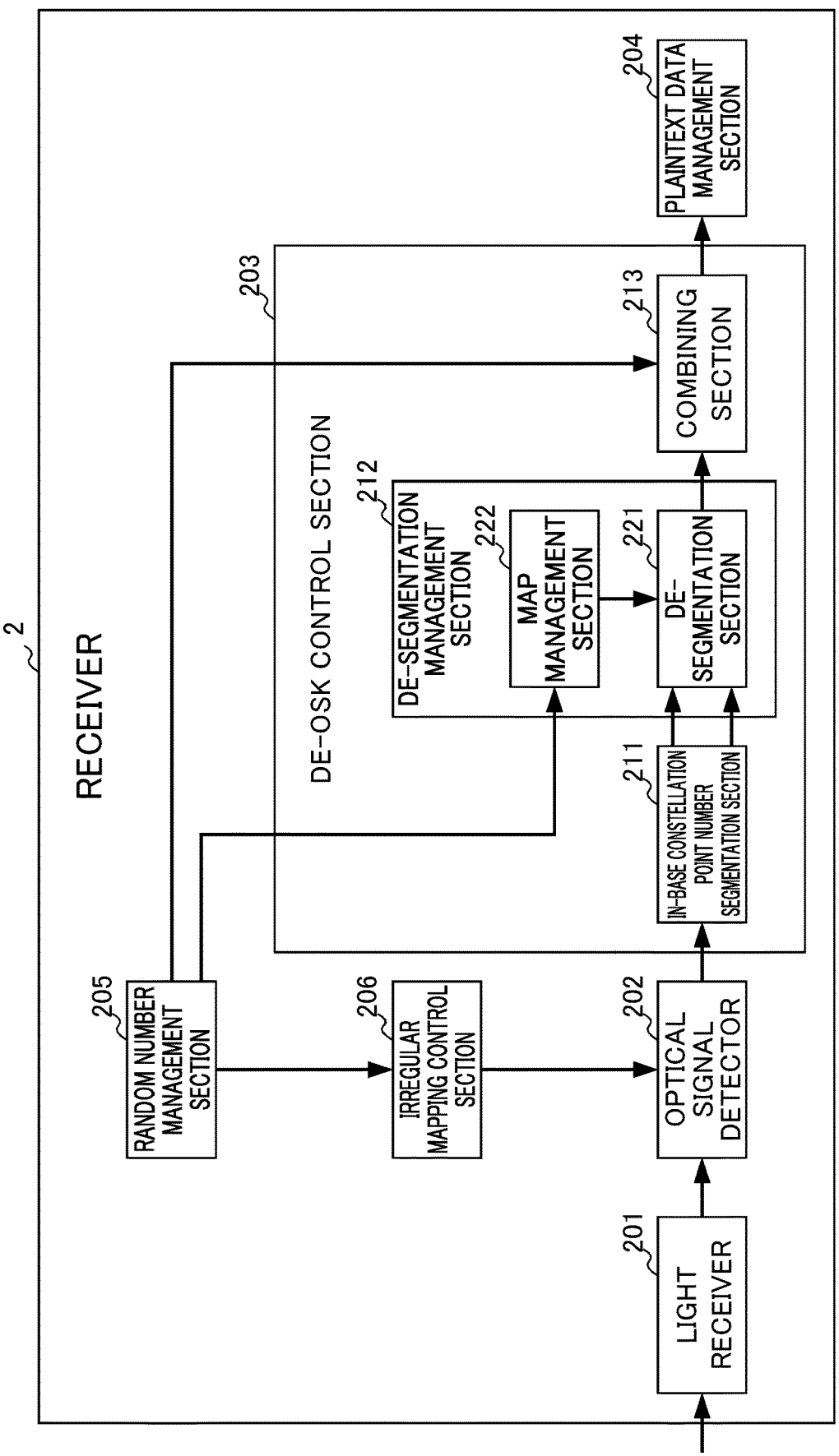
FIG. 11 is a block diagram showing an example of the detailed configuration of a de-OSK control section in the receiver of FIG. 7.
Figure 12:
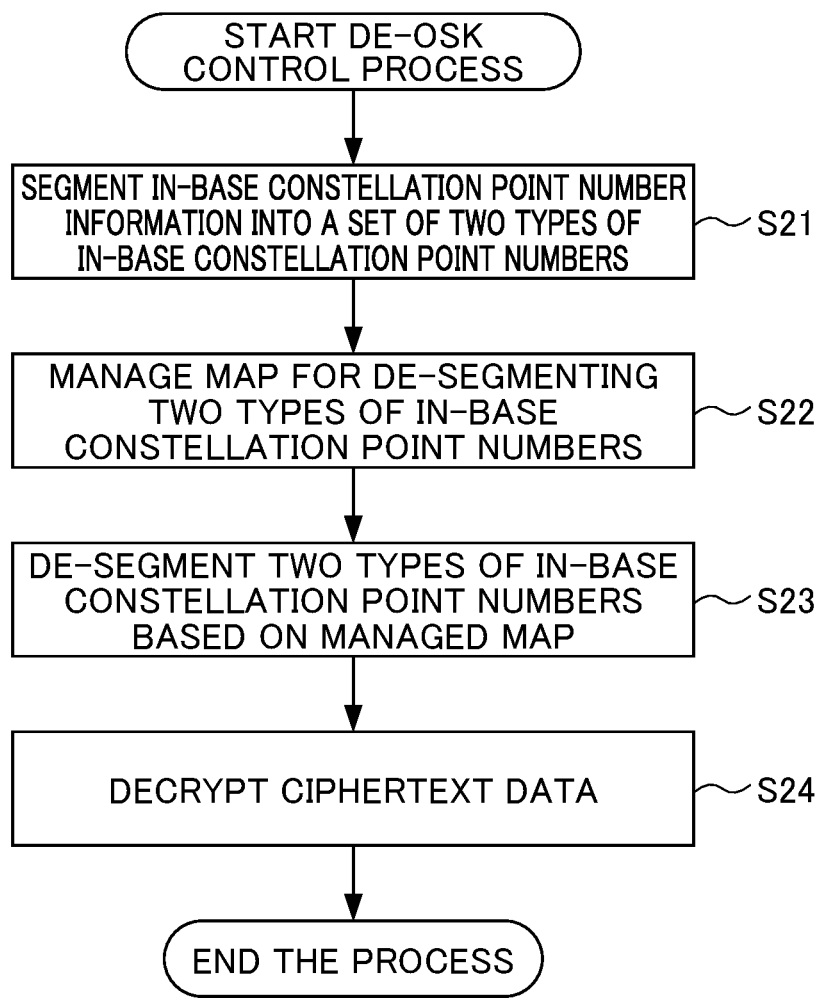
FIG. 12 is a flowchart for illustrating an example of the flow of the de-OSK executed by the receiver with the functional configuration of FIG. 11.

Next, with reference to FIGS. 11 and 12, a detailed description will be provided of the process of performing a predetermined process including de-OSK on the in-base constellation point number information to restore the plaintext data, which is executed by the de-OSK control section 203 of the receiver 2 shown in FIG. 7.

FIG. 11 is a block diagram showing an example of the detailed configuration of the de-OSK control section in the receiver shown in FIG. 7. In the example shown in FIG. 11, the de-OSK control section 203 includes an in-base constellation point number segmentation section 211, a de-segmentation management section 212, and a decryption section 213.

The in-base constellation point number segmentation section 211 receives the in-base constellation point number information corresponding to the received constellation point among the base including multiple constellation points and then segments the in-base constellation point number information into a set of two types of in-base constellation point numbers including the vertical in-base constellation point number information and the horizontal in-base constellation point number information.

The de-segmentation management section 212 includes a de-segmentation section 221 and a map management section 222. The de-segmentation management section 212 subjects, to de-segmentation based on the map data, the ciphertext data including the two types of in-base constellation point numbers including the vertical in-base constellation point number information and the horizontal in-base constellation point number information.

Based on the map data supplied from the map management section 222 described later, the de-segmentation section 221 subjects each of the bits of the vertical in-base constellation point numbers and the horizontal in-base constellation point numbers to de-segmentation of the ciphertext data to generate the ciphertext data. The term "de-segmentation" refers to a process reverse to the segmentation by the segmentation section 121 shown in FIG. 8. Specifically, for example, when the segmentation section 121 performs segmentation based on a map indicting that "the first bit of the ciphertext data CT is associated with the upper bit of the horizontal in-base constellation point number TBN2", the de-segmentation section 221 performs de-segmentation to associate the upper bit of the vertical in-base constellation point number with the first bit of the ciphertext data.

The map management section 222 manages the map for de-segmentation and supplies the map data to the de-segmentation section 221. Specifically, for example, based on third pseudorandom number data supplied from a random number management section 205, the map management section 222 selects a map to be used actually from the maps that it manages and supplies the map data to the de-segmentation section 221. For example, the map data supplied from the map management section 222 to the de-segmentation section is the same as that supplied from the map management section 122 to the segmentation section 121 in the transmitter 1. Thus, the de-segmentation section 221 successfully performs de-segmentation based on the map data that is used for the segmentation by the segmentation section 121.

The decryption section 213 performs the de-OSK which is mentioned above on the ciphertext data to restore the plaintext data. Based on first pseudorandom number data generated by the random number management section 205, the de-OSK control section 203 performs a predetermined process including de-OSK on the in-base constellation point number information, which is the received data, to restore the plaintext data.

FIG. 12 is a flowchart for illustrating an example of the flow of the de-OSK control process executed by the receiver having the functional configuration shown in FIG. 11. The de-OSK control process includes performing a predetermined process including de-OSK on the in-base constellation point number information, which is the received data, to restore the plaintext data.

In step S21, the in-base constellation point number segmentation section 211 segments the in-base constellation point number information, which corresponds to the received constellation point among the base including multiple constellation points, into a set of two types of in-base constellation point numbers including the vertical in-base constellation point number information and the horizontal in-base constellation point number information.

In step S22, the map management section 222 manages the map for de-segmentation and supplies the map data.

In step S23, the de-segmentation section 221 subjects, based on the map data, each of the bits of the vertical in-base constellation point numbers and the horizontal in-base constellation point numbers to de-segmentation of the ciphertext data to generate the ciphertext data.

In step S24, the de-OSK which is mentioned above is performed on the ciphertext data to restore the plaintext data.

The flow of the de-OSK control process executed by the transmitter 1 has been described with reference to FIG. 12.

Figure 13:
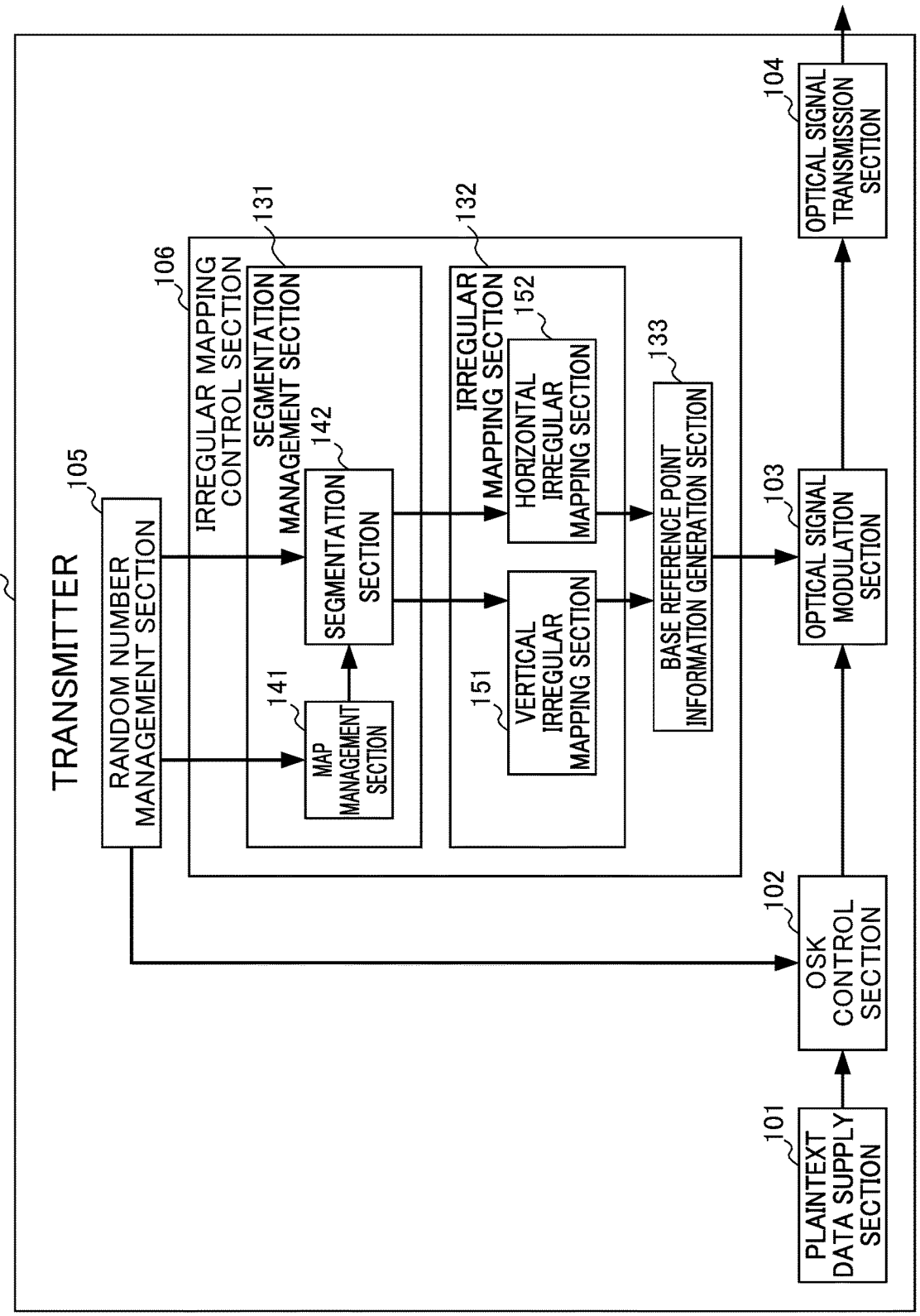
FIG. 13 is a block diagram showing an example of the detailed configuration of an irregular mapping control section in the transmitter of FIG. 6.

FIG. 13 is a functional block diagram illustrating an example of the detailed functional configuration of the irregular mapping control section 106 among the functional configurations for the transmitter 1 shown in FIG. 6. Components corresponding to those shown in FIG. 3 are denoted by the same reference numbers, and duplicated description thereof will be omitted as appropriate.

The functional block diagram of FIG. 13 shows an example of a functional configuration in which two-dimensional arrangement of signals is not entirely subjected to irregular mapping at a time but is subjected to two types of irregular mapping, one of which is in one of the two-dimensional directions (corresponding to the "vertical direction" in FIG. 4) and the other is in the other direction (corresponding to the "horizontal direction" in FIG. 4), which result from the division of the original irregular mapping.

Referring to FIG. 13, the irregular mapping control section 106 includes a segmentation management section 131, an irregular mapping section 132, and a base reference point information generation section 133.

The segmentation management section 131 includes a map management section 141 and a segmentation section 142. The segmentation management section 131 segments the second pseudorandom number data, which is generated by the random number management section 105, into two segments according to a predetermined rule so that data to be input for vertical irregular mapping and data to be input for horizontal irregular mapping are generated.

The map management section 141 manages maps each defining a predetermined segmentation rule for segmenting the second pseudorandom number data into two segments to generate data to be input for vertical irregular mapping and data to be input for horizontal irregular mapping. In this case, the map management section 141 manages plurality of maps. The map management section 141 employs one or more elements including at least one of a predetermined operation, a predetermined algorithm, and predetermined pseudorandom number information, and is configured to select one of the plurality of maps based on the one or more elements. In this case, the time required for the encryption does not depend on which element the method is based on. Thus, no time delay for the encryption, which is a characteristic of optical communication quantum cryptography using, for example, the Y-00 protocol, remains intact. When the map management section 141 selects a map based on at least predetermined pseudorandom number information, the random number management section 105 may generate a third common key as an initial value, which is a fixed-length bit stream different from both the first and second common keys, and the map management section 141 may select the map based on the third pseudorandom number data.

Based on the segmentation rule defined by one map selected by the map management section 141, the segmentation section 142 segments the second pseudorandom number data into two segments to generate data to be input for vertical irregular mapping and data to be input for horizontal irregular mapping.

The irregular mapping section 132 includes a vertical irregular mapping section 151 and a horizontal irregular mapping section 152. The irregular mapping section 132 performs vertical irregular mapping and horizontal irregular mapping on the input data, which have been generated by the segmentation section 142, to generate vertical base reference point data and horizontal base reference point data.

The vertical irregular mapping section 151 performs vertical irregular mapping on the input data, which has been generated for vertical irregular mapping by the segmentation section 142, to generate vertical base reference point data. Similarly, the horizontal irregular mapping section 152 performs horizontal irregular mapping on the input data, which has been generated for horizontal irregular mapping by the segmentation section 142, to generate horizontal base reference point data.

In this way, the original irregular mapping is divided into and handled as two types of irregular mapping for two types of components equal in size (irregular mapping for components in the vertical direction and irregular mapping for components in the horizontal direction in this example). In this case, the size of each of the two types of irregular mapping to be designed and the sum of the sizes of the two types of irregular mapping are smaller than that required when the original irregular mapping is entirely performed at a time. This will be explained using specific figures. For example, when irregular mapping is implemented based on the function of a reference table, the memory necessary for the original irregular mapping with a total number of constellation points of M, which is equal to L×L, wherein L is the number of in-base constellation points in the vertical and horizontal directions, has a size of 2×M (=2×L×L), namely twice the square of L, since the original irregular mapping has M inputs and M outputs. The irregular mapping for components in the vertical direction, which has L inputs and L outputs, has a size of 2×L. The irregular mapping for components in the horizontal direction also has a size of 2×L. Thus, when the original irregular mapping is divided into two types of irregular mapping for two types of components, the sum of the sizes of the two types of irregular mapping is 4×L. In this regard, for example, when L is 1,024, the size required when the original irregular mapping is handled at a time is 2,097,152, whereas the sum of the sizes of the two separate types of irregular mapping for the two types of components is 4,096. Even when further calculation is performed using, as L, a value 100 times that shown above (namely, L=102,400), the sum of the sizes of the two separate types of irregular mapping for the two types of components is 409,800. This is smaller than that required when the original irregular mapping with L equal to 1,024 is handled at a time. This means that the increase in the size of individual irregular mapping to be designed and the increase in the sum of the sizes of two types of irregular mapping for two types of components, which are caused by increasing the number of constellation points, can be kept low, when the original irregular mapping is divided into two types of irregular mapping for two types of components.

In this regard, as the original irregular mapping is divided into multiple types, the size of irregular mapping to be designed for each type of components will decrease so that the complexity of the design of each irregular mapping for each type of components will decrease. In other words, when the original irregular mapping is divided into multiple types, the increase in costs for the design of the transmitter, which is caused by increasing the number of constellation points, can be kept low.

Moreover, the sum of the sizes of memories necessary for the respective types of irregular mapping resulting from the division can be reduced, which makes it easy to downsize the transmitter. The costs for the manufacture of the transmitter, such as material costs and fabrication costs, can also be reduced. Furthermore, the small total size of the memories necessary for the respective types of irregular mapping resulting from the division helps to save the memory consumption of the transmitter. As a result, when the transmitter is installed in a system with a specific memory size, the remaining part of the memory can be allocated for other functions, such as control and monitoring, which leads to contribution to improvement of the performance of the transmitter. In other words, it is concluded that the division of the original irregular mapping can keep low the increase in costs for the manufacture and operation of the transmitter, which is caused by increasing the number of constellation points. The base reference point information generation section 133 combines the vertical base reference point data and the horizontal base reference point data to generate base reference point information, which is information defining the origin identifying the base.

Figure 14:
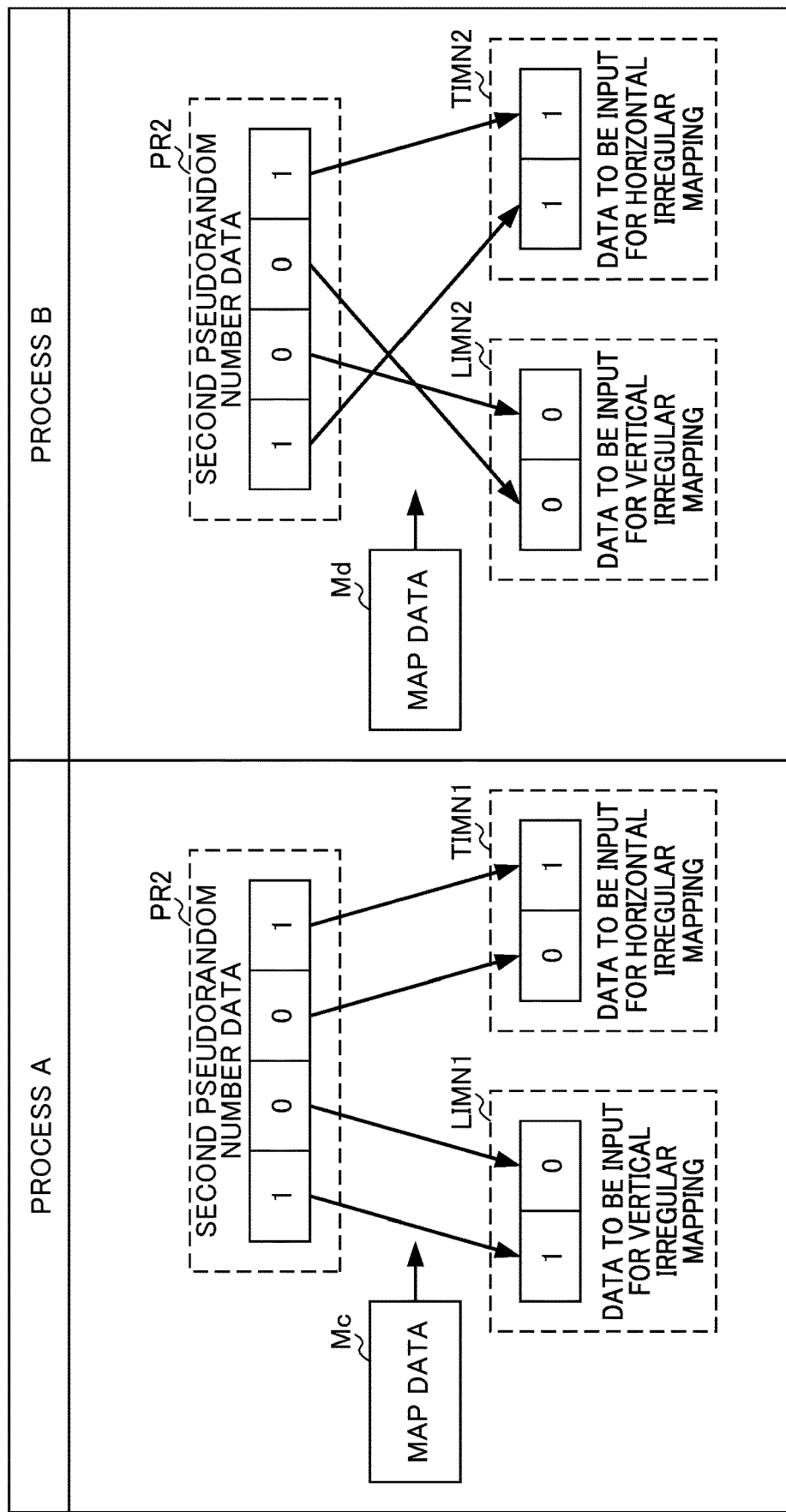
FIG. 14 is a diagram showing an example of segmentation of pseudorandom number information using the segmentation process shown in FIG. 13.

FIG. 14 is a diagram for illustrating an example of a segmentation process of pseudorandom number information based on map data, which is executed by the segmentation section 142. For the sake of simplicity of illustration, FIG. 14 shows a case in which four constellation points are provided in each of the vertical and horizontal directions, namely, 16 (4×4) constellation points are provided in total. In this case, the segmentation management section 131 segments 4-bit information, which identifies constellation point numbers in a single base, into two pieces of 2-bit information, which respectively identify in-base constellation point numbers in the vertical direction and in-base constellation point numbers in the horizontal direction. FIG. 14 illustrates process A that is executed by the segmentation section 142 and includes segmenting, based on map data Mc, second pseudorandom number data PR2 into data LIMN1 to be input for vertical irregular mapping and data TIMN1 to be input for horizontal irregular mapping. The map data Mc defines a segmentation rule for segmenting the second pseudorandom number data PR2 into data LIMN1 to be input for vertical irregular mapping and data TIMN1 to be input for horizontal irregular mapping, in which the data LIMN1 is the left two bits (10) of the data PR2 and the data TIMN1 is the right two bits (01) of the data PR2. FIG. 14 also illustrates process B that is executed by the segmentation section 142 and includes segmenting, based on map data Md, second pseudorandom number data PR2 into data LIMN2 to be input for vertical irregular mapping and data TIMN2 to be input for horizontal irregular mapping. The map data Md defines a segmentation rule for segmenting the second pseudorandom number data PR2 into data LIMN2 to be input for vertical irregular mapping and data TIMN2 to be input for horizontal irregular mapping, in which the data LIMN2 is a combination (00) of the second bit (0) and the third bit (0) of the data PR2 from the left, and the data TIMN2 is a combination (11) of the first left bit (1) and the first right bit (1) of the data PR2. In this way, the segmentation section 142 manages multiple pieces of map data and changes the map data as appropriate, so that the same pseudorandom number data can be interpreted as different combinations of data to be input for vertical irregular mapping and data to be input for horizontal irregular mapping. In this case, an eavesdropper who has stolen the data needs to do an additional step to identify the segmentation rule when attempting to crack the data. This means that the cost to the eavesdropper is higher. When the map management section 141 manages plurality of maps, employs one or more elements including at least one of a predetermined operation, a predetermined algorithm, and predetermined pseudorandom number information, and selects one of the plurality of maps based on the one or more elements, an eavesdropper who has stolen the data needs to do an additional step to identify the map selection method when attempting to crack the data. This means that the cost to the eavesdropper is higher.

Figure 15:
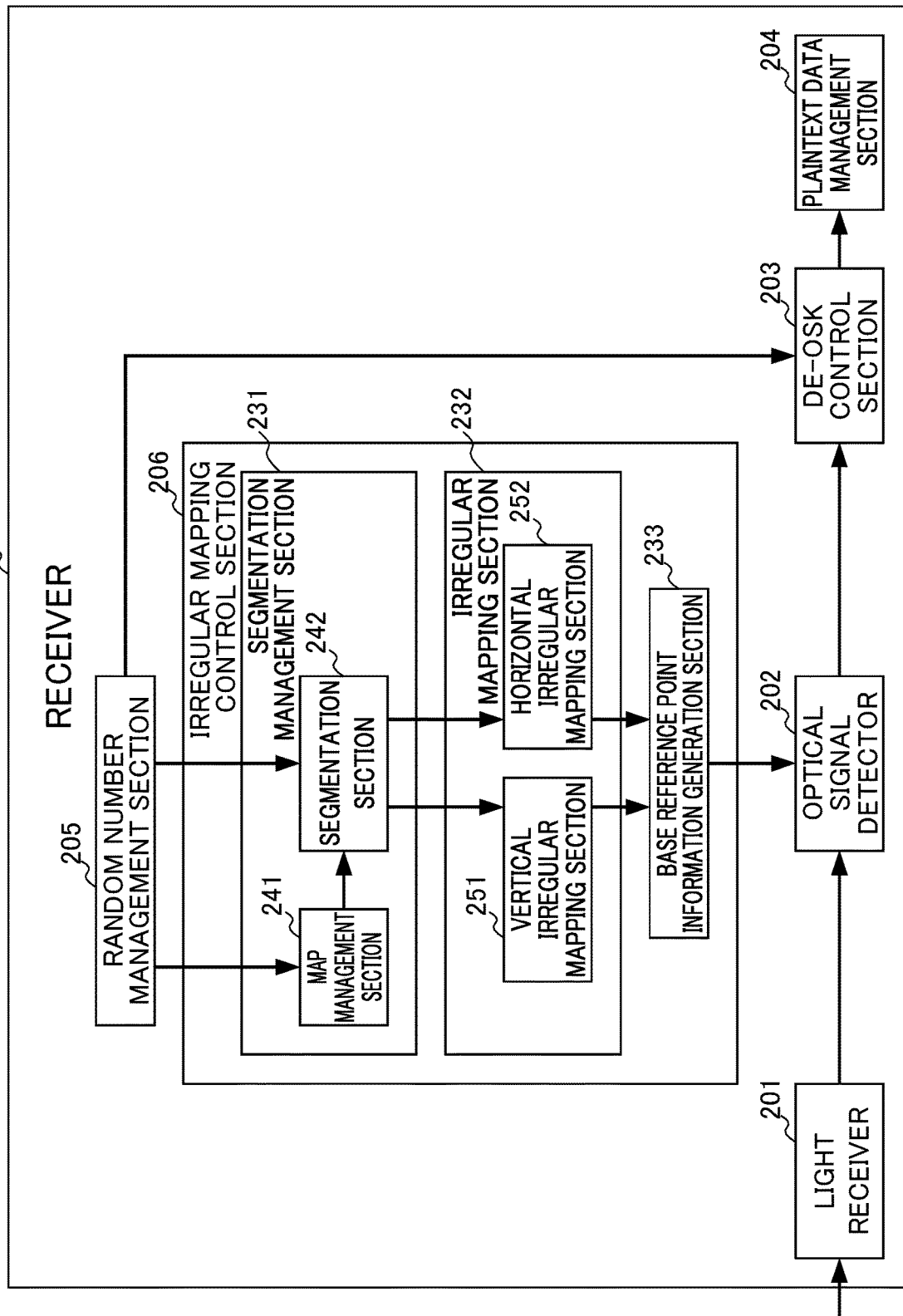
FIG. 15 is a block diagram showing an example of the detailed configuration of an irregular mapping control section in the receiver of FIG. 7.

FIG. 15 is a functional block diagram illustrating an example of the detailed functional configuration of the irregular mapping control section 206 among the functional configurations for the receiver shown in FIG. 7. Components corresponding to those shown in FIG. 7 are denoted by the same reference numbers, and duplicated description thereof will be omitted as appropriate.

Referring to the functional block diagram of FIG. 15, the irregular mapping control section 206 includes a segmentation management section 231, an irregular mapping section 232, and a base reference point information generation section 233. The segmentation management section 231 includes a map management section 241 and a segmentation section 242. The irregular mapping section 232 includes a vertical irregular mapping section 251 and a horizontal irregular mapping section 252.

The map management section 241 has the same function and configuration as those of the map management section 141 shown in FIG. 13, and the segmentation section 242 has the same function and configuration as those of the segmentation section 142 shown in FIG. 13. Accordingly, the segmentation management section 231 has the same function and configuration as those of the segmentation management section 131 shown in FIG. 13. The vertical irregular mapping section 251 has the same function and configuration as those of the vertical irregular mapping section 151 shown in FIG. 13, and the horizontal irregular mapping section 252 has the same function and configuration as those of the horizontal irregular mapping section 152 show in FIG. 13. Accordingly, the irregular mapping section 232 has the same function and configuration as those of the irregular mapping section 132 shown in FIG. 13. The base reference point information generation section 233 also has the same function and configuration as those of the base reference point information generation section 133 shown in FIG. 13. Accordingly, the irregular mapping control section 206 has the same function and configuration as those of the irregular mapping control section 106 shown in FIG. 13.

Figure 16:
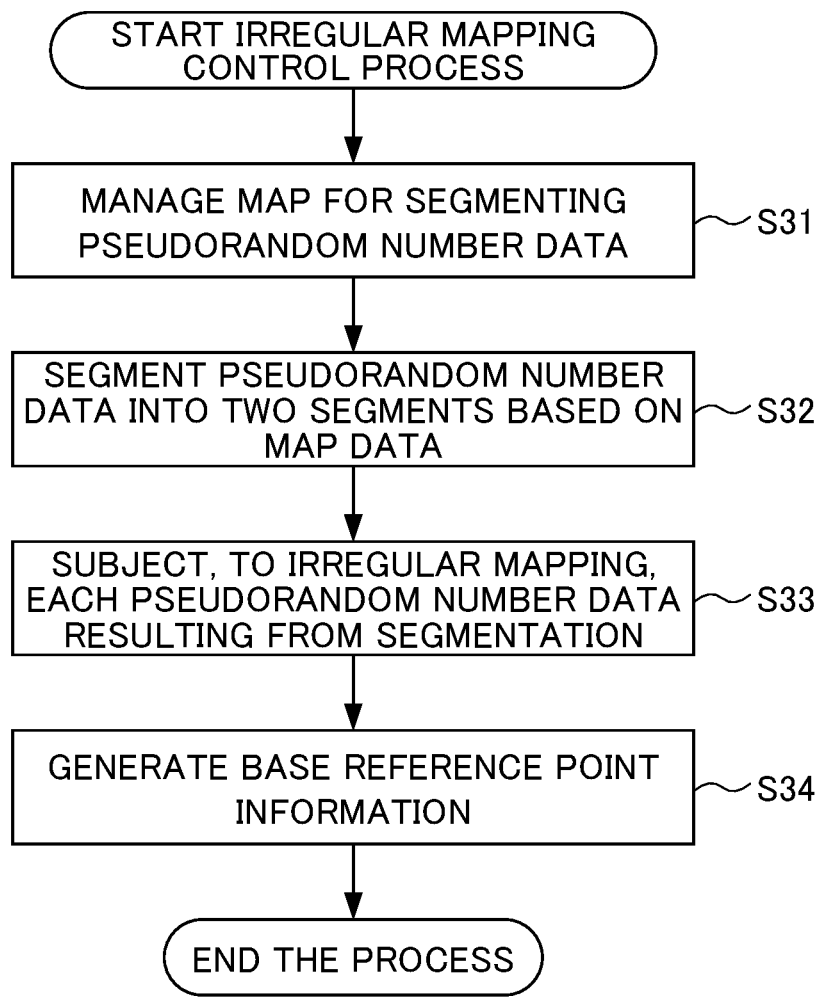
FIG. 16 is a flowchart for illustrating an example of the flow of an irregular mapping control process executed by the transmitter having the functional configuration shown in FIG. 13.

FIG. 16 is a flowchart for illustrating an irregular mapping control process executed by the irregular mapping control section 106 of the transmitter 1 and by the irregular mapping control section 206 of the receiver 2. In this case, as mentioned above, the irregular mapping control section 206 has the same function and configuration as those of the irregular mapping control section 106 shown in FIG. 13. With reference to FIG. 16, an example of the process performed by the irregular mapping control section 106 of the transmitter 1 will be described.

In step S31, the map management section 141 manages maps for the segmentation of pseudorandom number data, and supplies the map data. Specifically, for example, the map management section 141 selects one map defining a specific segmentation rule for segmenting the second pseudorandom number data, which is input into the irregular mapping control section 106, into data to be input for vertical irregular mapping and data to be input for horizontal irregular mapping.

In step S32, the segmentation section 142 segments the pseudorandom number data into two segments based on the map data. Specifically, for example, based on the segmentation rule defined by the one map selected by the map management section 141, the segmentation section 142 segments the second pseudorandom number data, which is generated by the random number management section 105, into data to be input for vertical irregular mapping and data to be input for horizontal irregular mapping.

In step S33, the vertical irregular mapping section 151 and the horizontal irregular mapping section 152 perform irregular mapping on the segments of the pseudorandom number data. Specifically, for example, the vertical irregular mapping section 151 performs irregular mapping on the data generated by the segmentation section 142 and input for vertical irregular mapping to generate vertical base reference point data. The horizontal irregular mapping section 152 also performs irregular mapping on the data generated by the segmentation section 142 and input for horizontal irregular mapping to generate horizontal base reference point data.

In step S34, the base reference point information generation section 133 generates base reference point information. Specifically, for example, the base reference point information generation section 133 combines the vertical base reference point data and the horizontal base reference point data to generate base reference point information, which is information defining the origin identifying the base.

While an embodiment of the present invention has been described, it will be understood that the embodiment is not intended to limit the present invention and may be altered or modified as long as the object of the present invention can be achieved, and such modifications also fall within the scope of the present invention.

For example, in the transmitter 1 according to the embodiment, the random number management section 105 generates and manages first, second, and third pseudorandom number data based on the first, second, and third common keys. It should be noted that this is a non-limiting feature. In other words, for example, any number of common keys may be used for the predetermined process to generate first, second, and third pseudorandom number data. That is, for the sake of simplicity of description, the embodiment merely shows a case in which the random number management section 105 generates first pseudorandom number data for use in the OSK control section 102, second pseudorandom number data for use in the irregular mapping control section 106, and third pseudorandom number data for use in the map management section 122. The same applies to the random number management section 205 of the receiver 2.

For example, in the transmitter 1 according to the embodiment, the optical signal modulation section 103 modulates an optical signal based on the in-base constellation point number information generated by the OSK control section 102 and the base reference point information generated by the irregular mapping control section 106. It should be noted that this is a non-limiting feature. For example, the OSK control section 102 may be configured to perform OSK on plaintext data to generate ciphertext data (in other words, the segmentation management section 112 and the in-base constellation point number generation unit 113 may be omitted from the OSK control section 102 shown in FIG. 8); the irregular mapping control section 106 may be configured to cause the irregular mapping section 132 to perform irregular mapping on the data generated by the segmentation management section 131 and input for vertical irregular mapping and on the data generated by the segmentation management section 131 and input for horizontal irregular mapping to generate vertical base reference point data and horizontal base reference point data (in other words, the base reference point information generation section 133 may be omitted from the irregular mapping control section 106 shown in FIG. 13); and the optical signal modulation section 103 may determine the constellation point offset in each of the vertical and horizontal directions for signal transmission (e.g., the phase offset and the amplitude offset in the case of QAM) based on the vertical base reference point data and the horizontal base reference point data and may modulate an optical signal based on information obtained by combining the offset information and the ciphertext data information.

For example, in the embodiment described above, the original irregular mapping is divided into two types of irregular mapping for two types of components: vertical irregular mapping and horizontal irregular mapping. It should be noted that this is a non-limiting feature. In other words, the original irregular mapping may be divided into m types of irregular mapping for m types of components, wherein m is an integer of 2 or more. In this case, for example, m or more types of irregular mapping for m or more types of components may be provided in advance, and m types of irregular mapping for m types of components may be selected based on one or more elements including at least one of a predetermined operation, a predetermined algorithm, and predetermined pseudorandom number information.

For example, different design standards may be set for multiple types of irregular mapping for multiple types of components since there is no definite method for designing irregular mapping. As a result, an eavesdropper who has stolen the data needs to take into account the possibility of handling multiple types of irregular mapping for multiple types of components, which differ in design standard, when attempting to crack the data. This means that the number of steps for cracking the data increases so that the cost to the eavesdropper is higher. As the original irregular mapping is divided into multiple types, the complexity of the design of each type of irregular mapping for each type of components decreases. As a result, individual design standards can be easily set for the multiple types of irregular mapping for multiple types of components as described above.

For example, how many types the original irregular mapping should be divided into may be determined based on the ease of handling practical aspects, such as design and operation. As the original irregular mapping is divided into multiple types, the single original large block is divided into small blocks that form a parallel circuit. As a result, each of the small blocks has a reduced data bus width. Thus, the degree of freedom of design increases. The increase in the degree of freedom of design can be utilized when how many types the original irregular mapping should be divided into is determined based on the ease of handling practical aspects, such as design and operation.

Moreover, for example, when the multiple types of irregular mapping being used should be replaced for a certain purpose, such as maintenance, management, or improvement, there is no need to replace, at the same time, all the multiple types of irregular mapping for multiple types of components. In other words, each of the multiple types of irregular mapping may be replaced at an optimal time. Alternatively, each of the multiple types of irregular mapping may be replaced at a time appropriate for the administrator or the like of the information processing device.

For example, each map in the map management section 141, which can be replaced at any time before the communication, may be replaced at a time appropriate for the administrator or the like of the information processing device, for example, when eavesdropping from some other environments is suspected.

For example, how to select the maps in the map management section 141 may also be determined taking into account the tradeoff between the safety of signal transmission and the cost for design, manufacture, and operation. For example, when the map management section 141 employs a method of selecting one map at least based on predetermined pseudorandom number information, the safety is high, because an eavesdropper who has stolen the data must crack the pseudorandom number information when attempting to crack the data. However, the employment of the method of selecting one map based on predetermined pseudorandom number information requires an additional pseudorandom number generator, which increases the cost for design, manufacture, and operation. In this regard, when the number of constellation points is sufficiently large, the number itself of segmentation rules for defining one available map can make sufficiently high the cost for an eavesdropper, who has stolen the data, to identify the map for cracking the data. In such a case, in order to reduce costs, an alternative method not using pseudorandom number information may be employed. On the other hand, when the number of constellation points is small, the map may be selected based on pseudorandom number information such that the small number of segmentation rules for defining one available map can be compensated for. When there is no problem with cost, the method based on predetermined pseudorandom number information may be actively employed.

For example, in the design of the irregular mapping control section, how many types the original irregular mapping should be divided into, how many types of irregular mapping should be provided in advance, how many maps should be provided, and how to select each type of irregular mapping or each map (e.g., how to select based on a predetermined algorithm or predetermined pseudorandom number information) may be comprehensively determined according to the purpose taking into account the tradeoff between the safety of signal transmission and the cost for design, manufacture, and operation.

For example, in the embodiment described above, the plaintext data supply section 101 is configured to receive and supply plaintext data, which is transmitted in an unencrypted form from the transmitter 1. It should be noted that this is a non-limiting feature. For example, the data for use in the validation of the transmitter 1 may be generated in the plaintext data supply section 101.

In summary, the information processing device according to the present invention only has to have the features shown below and may have various other features.

For example, in the embodiment described above, the cryptographic communication system includes the transmitter 1, the receiver 2, and the optical communication channel C. It should be noted that this is a non-limiting feature. Alternatively, for example, the transmitter and the receiver may each be a transceiver. Specifically, for example, the transmitter may further include a receiver as an input part for receiving optical signals, and the receiver may further include a transmitter as an output part for transmitting optical signals. Thus, the transceivers communicate with each other. Moreover, in the cryptographic communication system, the transceivers may be connected not only on a one-to-one basis but also on any other basis. Specifically, for example, the optical communication channel may include a splitter or other components for splitting an optical signal so that multiple transceivers can be connected to form a network.

For example, in the embodiment described above, the origin identifying the base, that is, the information determining the reference point, is referred to as base reference point information. It should be noted that this is a non-limiting feature. For example, the base reference point information may be any type that identify the base. Specifically, for example, the base reference point information may be information that gives the values of components I and Q for each of constellation points in the base. In other words, the base reference point information may be information that uniquely identifies each of multiple bases among multiple values of component I and multiple values of component Q defined for constellation points in the bases.

For example, the embodiment shows an example in which QAM is employed for the optical signal modulation by the Y-00 protocol. It should be noted that this is a non-limiting feature. For example, the optical signal modulation may be any type of modulation, such as intensity modulation, amplitude modulation, phase modulation, frequency modulation, or quadrature amplitude modulation.

For example, in the embodiment described above, QAM is employed for the optical signal modulation by the Y-00 protocol, and the horizontal in-base constellation point number and the vertical in-base constellation point number determine the components I and Q, respectively. It should be noted that this is a non-limiting feature. For example, the vertical direction and the horizontal direction may be any directions orthogonal to each other for components subjected to modulation. Specifically, for example, in the case of intensity modulation, the horizontal base in-base constellation point number and the vertical in-base constellation point number may determine the component for coarse intensity modulation and the component for fine intensity modulation, respectively.

For example, in the embodiment described above, the in-base constellation point numbers are assigned according to the gray code in the example shown in FIG. 4. It should be noted that this is a non-limiting feature. For example, the in-base constellation point numbers only have to uniquely correspond to the constellation points. Specifically, for example, serial binary numbers may be assigned, or binary numbers may be assigned in a non-serial manner, such as BCD code or excess-three code.

For example, in the embodiment described above, the map data supplied from the map management section 222 to the de-segmentation section is the same as the map data supplied from the map management section 122 to the segmentation section 121 in the transmitter 1. It should be noted that this is a non-limiting feature. For example, the map data may be any type of data that enables de-segmentation. Specifically, for example, the map data may be such that it has such a reverse relationship with the map data provided from the map management section 122 to the segmentation section 121 in the transmitter 1 that de-segmentation can be executed at high speed. In other words, the map data may be such that it enables each bit of the ciphertext data to be derived from each bit of the horizontal in-base constellation point number or the vertical in-base constellation point number instead of enabling each bit of the horizontal in-base constellation point number or the vertical in-base constellation point number to be derived from each bit of the ciphertext data.

For example, in the embodiment described above, the random number management section 105 generates and manages the first pseudorandom number data based on the first common key, and generates and manages the second pseudorandom number data based on the second common key. It should be noted that this is a non-limiting feature. Specifically, for example, the pseudorandom number data including the first pseudorandom number data and the second pseudorandom number data may be generated based on a single key, and what type the pseudorandom number data should be handled as may be managed according to the order in which the pseudorandom number data are generated.

For example, in the embodiment described above, the plaintext data supply section 101 acquires the plaintext data as a transmission target. It should be noted that this is a non-limiting feature. That is, for example, the plaintext data supply section 101 only has to acquire or generate and supply predetermined information. Specifically, for example, the data for the validation of the cryptographic communication system may be internally generated as the predetermined information.

For example, in the embodiment described above, the encryption section 111 performs OSK on the plaintext data as a transmission target data to generate ciphertext data. It should be noted that this is a non-limiting feature. That is, the encryption section 111 may be any section that generates a predetermined information identifier capable of uniquely identifying the predetermined information. Specifically, for example, the information for uniquely identifying the predetermined information may be data generated by simply reversing the bits of the plaintext data or a bit stream generated by reversibly compressing the plaintext data. In other words, an identifier longer than the predetermined information may be generated as the identifier for uniquely identifying the predetermined information. Specifically, for example, the plaintext data with a 2-bit length may be subjected to a predetermined process to generate 4-bit ciphertext information. Thus, the physical signals are encrypted by the Y-00 protocol.

For example, in the embodiment described above, the segmentation section 121 of the segmentation management section 112 segments the ciphertext data into two types of in-base constellation point numbers, i.e., vertical in-base constellation point numbers and horizontal in-base constellation point numbers, based on the map data. It should be noted that this is a non-limiting feature. That is, the segmentation management section only has to segment the predetermined information identifier into n types of identifiers, wherein n is an integer of 2 or more, based on a predetermined rule. Specifically, for example, depth in-base constellation point numbers may be generated, and the n types of identifiers may include the depth in-base constellation point numbers in addition to the vertical in-base constellation point numbers and the horizontal in-base constellation point numbers. In other words, constellation points may be arranged to form an n-dimensional base, and the segmentation section may segment the ciphertext information into n types of in-base constellation point numbers.

For example, in the embodiment described above, the in-base constellation point number generation section 113 concatenates the vertical in-base constellation point number LBN1 and the horizontal in-base constellation point number TBN1 to generate in-base constellation point number information. It should be noted that this is a non-limiting feature. That is, for example, the in-base constellation point number generation section may be any transmission information generation section that generates transmission target information based on a set of the n types of identifiers. Specifically, for example, the in-base constellation point number generation section may associate each bit of the n types of identifiers with each bit of the transmission target information to be generated. This further improves the safety of the data transmission for the transmission target information.

For example, the embodiment shows an example in which the map management section 122 can switch, based on the third pseudorandom number data, the map data to be supplied. It should be noted that this is a non-limiting feature. That is, for example, the segmentation management section only has to manage plurality of maps defining plurality of rules, which are each employable as the predetermined rule, and to segment the predetermined information identifier into the n types of identifiers using, as the predetermined rule, the rule based on one of the maps. Specifically, for example, the administrator of the cryptographic communication system may switch between the plurality of maps not based on the third pseudorandom number data. The segmentation management section may select the map at least based on one or more of a predetermined operation, a predetermined algorithm, and predetermined pseudorandom number information.

For example, the embodiment shows an example in which the segmentation section 142 of the segmentation management section 131 segments, based on the segmentation rule defined by the one selected map, the second pseudorandom number data into two segments: data to be input for vertical irregular mapping; and data to be input for horizontal irregular mapping. It should be noted that this is a non-limiting feature. That is, for example, the segmentation section only has to segment the pseudorandom number information into m types of pseudorandom number information based on a predetermined rule. Specifically, for example, the segmentation section may segment the second pseudorandom number data into three segments: data to be input for vertical irregular mapping; data to be input for horizontal irregular mapping; and data to be input for depth irregular mapping. This further improves the safety of the data transmission for the transmission target information.

For example, the embodiment shows an example in which the irregular mapping section 132 performs irregular mapping on the data input for vertical irregular mapping and the data input for horizontal irregular mapping, which have been generated by the segmentation section 142, to generate vertical base reference point data and horizontal base reference point data. It should be noted that this is a non-limiting feature. That is, for example, the irregular mapping section may be any disordering section that performs a predetermined disordering process on each of the m types of pseudorandom number information to generate m types of base reference point information.

For example, the embodiment shows an example in which the base reference point information generation section 133 combines the vertical base reference point data and the horizontal base reference point data to generate base reference point information, which is information defining the origin identifying the base. It should be noted that this is a non-limiting feature. That is, for example, the base reference point information generation section may be any modulation reference point determination section that determines, based on the m types of base reference point information, m types of components for the signal modulation reference point.

For example, the embodiment shows an example in which the map management section 141 manages maps each defining a predetermined segmentation rule for segmenting the second pseudorandom number data into two segments: data to be input for vertical irregular mapping and data to be input for horizontal irregular mapping. It should be noted that this is a non-limiting feature. That is, for example, the segmentation management section only has to manage plurality of maps defining plurality of rules each employable as the predetermined rule and to segment the pseudorandom number information into the m types of pseudorandom number information using, as the predetermined rule, a rule based on one of the maps. The segmentation management section may further select the map at least based on one or more of a predetermined operation, a predetermined algorithm, and predetermined pseudorandom number information.

For example, the series of processes described above may be implemented by hardware or software. In other words, the functional configurations shown in FIGS. 6 and 7 are merely non-limiting examples. That is, the information processing system only has to have functions that enable the series of processes to be executed as a whole, and the examples shown in FIGS. 3 and 4 are not intended to limit what functional blocks should be used to achieve the functions. Moreover, the locations of the functional blocks are not limited to those shown in FIGS. 3 and 4 and may be any other locations. Furthermore, any one of the functional blocks may include hardware or software alone or a combination thereof.

For example, when the series of processes are implemented by software, programs constituting the software may be installed into a computer or other devices through a network or from a recording medium. The computer may be one incorporated in dedicated hardware. The computer may also be one that executes various functions when various programs are installed into it, such as a server, a smartphone, a personal computer, or any other device.

For example, the recording medium containing such programs may be not only a removable medium (not shown), which is distributed to provide the programs to the user independently from the device itself, but also a recording medium incorporated in advance in the device itself and provided to the user.

In the present disclosure, the step of writing programs on the recording medium is intended to include not only processes that are executed in a time series manner according to the order but also processes that are executed in parallel or separately and are not always executed in a time series manner.

Specifically, the present invention is directed to an information processing device (e.g., the transmitter 1 shown in FIG. 1) that transmits predetermined information (e.g., plaintext data PT information shown in FIG. 9), the information processing device including:
  a generation section (e.g., the encryption section 111 shown in FIG. 8) that generates a predetermined information identifier (the ciphertext data CT shown in FIG. 9) capable of uniquely identifying the predetermined information;
  a segmentation management section (e.g., the segmentation management section 112 shown in FIG. 8) that segments the predetermined information identifier into n types of identifiers (e.g., the vertical in-base constellation point number LBN2 and the horizontal in-base constellation point number TBN2 shown in FIG. 9), wherein n is an integer of 2 or more, based on a predetermined rule (e.g., the map data Mb shown in FIG. 9); and
  a transmission information generation section (e.g., the in-base constellation point number generation section 113 shown in FIG. 8) that generates, based on a set of the n types of identifiers, information to be transmitted (e.g., the in-base constellation point number information).

The segmentation management section may manage plurality of maps (e.g., the map data Ma and the map data Mb shown in FIG. 9) defining plurality of rules each employable as the predetermined rule and may segment the predetermined information identifier into the n types of identifiers using, as the predetermined rule, a rule based on one of the maps.

The segmentation management section may select a map at least based on one or more of a predetermined operation (e.g., an operation by the administrator of the transmitter 1), a predetermined algorithm (e.g., an algorithm for control according to time or clock), and predetermined pseudorandom number information (e.g., the second pseudorandom number data).

The present invention is also directed to an information processing device (e.g., the transmitter 1 or the receiver 2 shown in FIG. 1) that determines a signal modulation reference point based on predetermined first pseudorandom number information (e.g., the second pseudorandom number data), the information processing device including:
  a segmentation management section (e.g., the segmentation management section 131 shown in FIG. 13 or the segmentation management section 231 shown in FIG. 15) that segments the first pseudorandom number information into m types of second pseudorandom number information (e.g., the data LIMN2 to be input for vertical irregular mapping and the data TIMN2 to be input for horizontal irregular mapping shown in FIG. 14), wherein m is an integer of 2 or more, based on a predetermined rule (e.g., the map data Mc shown in FIG. 14);

a disordering section (e.g., the vertical irregular mapping section 151 and the horizontal irregular mapping section 152 shown in FIG. 13 or the vertical irregular mapping section 251 and the horizontal irregular mapping section 252 shown in FIG. 15) that subjects each of the m types of second pseudorandom number information to a predetermined disordering process to generate m types of base reference point information; and a modulation reference point determination section (e.g., the base reference point information generation section 133 shown in FIG. 13 or the base reference point information generation section 233 shown in FIG. 15) that determines m types of components for the signal modulation reference point based on the m types of base reference point information.

The segmentation management section may manage plurality of maps (e.g., the map data Mc and the map data Md shown in FIG. 14) defining plurality of rules each employable as the predetermined rule and may segment the first pseudorandom number information into the m types of second pseudorandom number information using, as the predetermined rule, a rule based on one of the maps.

The segmentation management section may select a map at least based on one or more of a predetermined operation, a predetermined algorithm, and predetermined pseudorandom number information.

EXPLANATION OF REFERENCE NUMERALS 1 transmitter, 2 receiver, 11 CPU, 12 ROM, 13 RAM, 14 bus, 15 input/output interface, 16 output unit, 17 input unit, 18 storage unit, 19 communication unit, 20 drive, 31 removable medium, 101 plaintext data supply section, 102 OSK control section, 103 optical signal modulation section, 104 optical signal transmission section, 105 random number management section, 106 irregular mapping control section, 111 encryption section, 112 segmentation management section, 113 in-base constellation point number generation section, 121 segmentation section, 122 map management section, 131 segmentation management section, 132 irregular mapping section, 133 base reference point information generation section, 141 map management section, 142 segmentation section, 151 vertical irregular mapping section, 152 horizontal irregular mapping section, 201 light receiver, 202 optical signal detector, 203 de-OSK control section, 204 plaintext data management section, 205 random number management section, 206 irregular mapping control section, 211 in-base constellation point number segmentation section, 212 de-segmentation management section, 213 decryption section, 222 map management section, 231 segmentation management section, 232 irregular mapping section, 233 base reference point information generation section, 221 de-segmentation section, 241 map management section, 242 segmentation section, 251 vertical irregular mapping section, 252 horizontal irregular mapping section, C optical communication channel, CT ciphertext data, LBN1 vertical in-base constellation point number, LBN2 vertical in-base constellation point number, LIMN1 data to be input for vertical irregular mapping, LIMN2 data to be input for vertical irregular mapping, Ma map data, Mb map data, Mc map data, Md map data, PR1 first pseudorandom number data, PR2 second pseudorandom number data, PT plaintext data, S1 constellation point, S2 constellation point, TBN1 horizontal in-base constellation point number, TBN2 horizontal in-base constellation point number, TIMN1 data to be input for horizontal irregular mapping, TIMN2 data to be input for horizontal irregular mapping, Z0000 in-base constellation point number, Z0001 in-base constellation point number, Z0011 in-base constellation point number, Z0010 in-base constellation point number, Z0100 in-base constellation point number, Z0101 in-base constellation point number, Z0111 in-base constellation point number, Z0110 in-base constellation point number, Z1100 in-base constellation point number, Z1101 in-base constellation point number, Z1111 in-base constellation point number, Z1110 in-base constellation point number, Z1000 in-base constellation point number, Z1001 in-base constellation point number, Z1011 in-base constellation point number, Z1010 in-base constellation point number.

The invention claimed is:

1. An information processing device that determines a signal modulation reference point based on predetermined first pseudorandom number information, the information processing device comprising:
a central processing unit configured to perform operations comprising:
segmenting the first pseudorandom number information into in types of second pseudorandom number information based on a predetermined rule;
subjecting each of the m types of second pseudorandom number information to a predetermined disordering process to generate m types of base reference point information; and
determining m types of components for the signal modulation reference point based on the m types of base reference point information.

2. The information processing device according to claim 1, wherein
the segmenting includes managing a plurality of maps defining a plurality of rules each employable as the predetermined rule and segmenting the first pseudorandom number information into the m types of second pseudorandom number information using, as the predetermined rule, a rule based on one of the maps.

3. The information processing device according to claim 2, wherein
the segmenting includes selecting a map at least based on one or more of a predetermined operation, a predetermined algorithm, and predetermined pseudorandom number information.

* * * * *